US012022271B2

(12) United States Patent
Seefeldt et al.

(10) Patent No.: US 12,022,271 B2
(45) Date of Patent: Jun. 25, 2024

(54) DYNAMICS PROCESSING ACROSS DEVICES WITH DIFFERING PLAYBACK CAPABILITIES

(71) Applicants: Dolby Laboratories Licensing Corporation, San Francisco, CA (US); DOLBY INTERNATIONAL AB, Amsterdam Zuidoost (NL)

(72) Inventors: Alan J. Seefeldt, Alameda, CA (US); Joshua B. Lando, Mill Valley, CA (US); Daniel Arteaga, Spain (ES)

(73) Assignees: Dolby Laboratories Licensing Corporation, San Francisco, CA (US); DOLBY INTERNATIONAL AB, Dublin (IE)

( * ) Notice: Subject to any disclaimer, the term of this patent is extended or adjusted under 35 U.S.C. 154(b) by 103 days.

(21) Appl. No.: 17/630,897

(22) PCT Filed: Jul. 27, 2020

(86) PCT No.: PCT/US2020/043764

§ 371 (c)(1),
(2) Date: Jan. 27, 2022

(87) PCT Pub. No.: WO2021/021750

PCT Pub. Date: Feb. 4, 2021

(65) Prior Publication Data

US 2022/0360899 A1 Nov. 10, 2022

Related U.S. Application Data

(60) Provisional application No. 62/705,410, filed on Jun. 25, 2020, provisional application No. 62/705,143,
(Continued)

(30) Foreign Application Priority Data

Jul. 30, 2019 (ES) .................................. 201930702

(51) Int. Cl.
*H04R 5/04* (2006.01)
*H04R 3/04* (2006.01)
(Continued)

(52) U.S. Cl.
CPC ................ *H04R 5/04* (2013.01); *H04R 3/04* (2013.01); *H04R 5/02* (2013.01); *H04S 3/008* (2013.01); *H04S 7/307* (2013.01); *H04S 2400/01* (2013.01)

(58) Field of Classification Search
CPC .... H04R 5/02; H04R 5/04; H04R 3/04; H04S 3/008; H04S 7/307; H04S 2400/01
(Continued)

(56) References Cited

U.S. PATENT DOCUMENTS 9,226,073 B2 12/2015 Ramos
9,412,385 B2 8/2016 Sen
(Continued)

FOREIGN PATENT DOCUMENTS

CN 104604256 A 5/2015
CN 104604257 A 5/2015
(Continued)

OTHER PUBLICATIONS

Spatial Audio for VR: An Overview, published on Feb. 15, 2018.

*Primary Examiner* — William A Jerez Lora

(57) ABSTRACT

Individual loudspeaker dynamics processing configuration data, for each of a plurality of loudspeakers of a listening environment, may be obtained. Listening environment dynamics processing configuration data may be determined, based on the individual loudspeaker dynamics processing configuration data. Dynamics processing may be performed on received audio data based on the listening environment dynamics processing configuration data, to generate processed audio data. The processed audio data may be ren-
(Continued)

dered for reproduction via a set of loudspeakers that includes at least some of the plurality of loudspeakers, to produce rendered audio signals. The rendered audio signals may be provided to, and reproduced by, the set of loudspeakers.

16 Claims, 22 Drawing Sheets

Related U.S. Application Data filed on Jun. 12, 2020, provisional application No. 62/971,421, filed on Feb. 7, 2020, provisional application No. 62/880,115, filed on Jul. 30, 2019.

(51) Int. Cl.
*H04R 5/02* (2006.01)
*H04S 3/00* (2006.01)
*H04S 7/00* (2006.01)

(58) Field of Classification Search
USPC .................................................. 381/1, 59, 303
See application file for complete search history.

(56) References Cited

U.S. PATENT DOCUMENTS

| | | | |
|---|---|---|---|
| 9,646,620 | B1 | 5/2017 | Oh |
| 9,723,425 | B2 | 8/2017 | Fischer |
| 9,813,804 | B2 | 11/2017 | Franck |
| 9,933,989 | B2 | 4/2018 | Tsingos |
| 10,074,373 | B2 | 9/2018 | Atti |
| 10,096,325 | B2 | 10/2018 | Terentiv |
| 10,264,355 | B2 | 4/2019 | Klingler |
| 10,276,173 | B2 | 4/2019 | Baumgarte |
| 10,334,384 | B2 | 6/2019 | Sun |
| 2013/0013096 | A1 | 1/2013 | Seefeldt |
| 2015/0131966 | A1 | 5/2015 | Zurek |
| 2015/0222991 | A1* | 8/2015 | Ramos ................... H04R 27/00 381/80 |
| 2016/0104491 | A1 | 4/2016 | Lee |
| 2016/0134988 | A1 | 5/2016 | Gorzel |
| 2016/0212559 | A1 | 7/2016 | Mateos Sole |
| 2017/0012591 | A1 | 1/2017 | Rider |
| 2017/0032793 | A1* | 2/2017 | Baumgarte ........... G10L 19/008 |
| 2017/0125023 | A1 | 5/2017 | Oh |
| 2017/0280264 | A1 | 9/2017 | Wang |
| 2018/0115850 | A1 | 4/2018 | De Burgh |
| 2018/0152803 | A1 | 5/2018 | Seefeldt |
| 2018/0352329 | A1* | 12/2018 | Klingler ............... H04R 1/2888 |
| 2018/0357038 | A1 | 12/2018 | Olivieri |
| 2019/0124458 | A1 | 4/2019 | Sheen |
| 2019/0158974 | A1 | 5/2019 | Tsingos |
| 2019/0166447 | A1 | 5/2019 | Seldess |
| 2019/0239013 | A1 | 8/2019 | Audfray |
| 2020/0351606 | A1 | 11/2020 | Seefeldt |

FOREIGN PATENT DOCUMENTS

| | | | |
|---|---|---|---|
| CN | 105075292 | A | 11/2015 |
| CN | 107113528 | A | 8/2017 |
| CN | 107211227 | A | 9/2017 |
| CN | 107465990 | A | 12/2017 |
| CN | 107509141 | A | 12/2017 |
| EP | 3209034 | A1 | 8/2017 |
| EP | 3223542 | B1 | 4/2021 |
| GB | 2561844 | A | 10/2018 |
| JP | H7020892 | | 1/1995 |
| JP | 2005217559 | A | 8/2005 |
| JP | 2007068125 | A | 3/2007 |
| JP | 2015510283 | A | 4/2015 |
| JP | 2015530825 | A | 10/2015 |
| JP | 2016536919 | A | 11/2016 |
| JP | 2016538587 | A | 12/2016 |
| JP | 2017181761 | A | 10/2017 |
| KR | 1020180019715 | A | 2/2018 |
| NO | 2019089322 | W | 5/2019 |
| WO | 2013049125 | A1 | 4/2013 |
| WO | 2014007724 | A1 | 1/2014 |
| WO | 2016048381 | W | 3/2016 |
| WO | 2018064410 | W | 4/2018 |
| WO | 2018202324 | A1 | 11/2018 |
| WO | 2019067445 | A1 | 4/2019 |
| WO | 2019067620 | A1 | 4/2019 |
| WO | 2019246457 | A1 | 12/2019 |

* cited by examiner

500a

500b

900

DYNAMICS PROCESSING ACROSS DEVICES WITH DIFFERING PLAYBACK CAPABILITIES

CROSS-REFERENCE TO RELATED APPLICATIONS

This application claims priority to Spanish Patent Application No. P201930702, filed Jul. 30, 2019, U.S. Provisional Patent Application No. 62/971,421, filed Feb. 7, 2020, U.S. Provisional Patent Application No. 62/705,410, filed Jun. 25, 2020, U.S. Provisional Patent Application No. 62/880, 115, filed Jul. 30, 2019 and U.S. Provisional Patent Application No. 62/705,143, filed Jun. 12, 2020, each of which is hereby incorporated by reference in its entirety.

TECHNICAL FIELD

This disclosure pertains to systems and methods for playback, and rendering for playback, of audio by some or all speakers of a set of speakers.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, "speaker" and "loudspeaker" are used synonymously to denote any sound-emitting transducer (or set of transducers) driven by a single speaker feed. A typical set of headphones includes two speakers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Herein, we use the expression "smart audio device" to denote a smart device which is either a single purpose audio device or a virtual assistant (e.g., a connected virtual assistant). A single purpose audio device is a device (e.g., a TV or a mobile phone) including or coupled to at least one microphone (and optionally also including or coupled to at least one speaker and/or at least one camera), and/or at least one speaker (and optionally also including or coupled to at least one microphone), and which is designed largely or primarily to achieve a single purpose. Although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single purpose audio device having speaker(s) and microphone(s) is often configured to run a local application and/or service to use the speaker(s) and microphone(s) directly. Some single purpose audio devices may be configured to group together to achieve playing of audio over a zone or user configured area.

A virtual assistant (e.g., a connected virtual assistant) is a device (e.g., a smart speaker or voice assistant integrated device) including or coupled to at least one microphone (and optionally also including or coupled to at least one speaker and/or at least one camera) and which may provide an ability to utilize multiple devices (distinct from the virtual assistant) for applications that are in a sense cloud enabled or otherwise not implemented in or on the virtual assistant itself. Virtual assistants may sometimes work together, e.g., in a very discrete and conditionally defined way. For example, two or more virtual assistants may work together in the sense that one of them, i.e., the one which is most confident that it has heard a wakeword, responds to the word. The connected devices may form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (i.e., is listening for) a sound command In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a good compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

Some embodiments involve methods for rendering (or rendering and playback) of a spatial audio mix (e.g., rendering of a stream of audio or multiple streams of audio) for playback by at least one (e.g., all or some) of the smart audio devices of a set of smart audio devices, and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds).

A class of embodiments involves methods for rendering (or rendering and playback) of audio by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some of (i.e., by speaker(s) included in or coupled to all or some of) the smart audio devices.

Some embodiments of the present disclosure are systems and methods for audio processing that involves rendering audio (e.g., rendering a spatial audio mix, for example by rendering a stream of audio or multiple streams of audio) for playback by at least two speakers (e.g., all or some of the speakers of a set of speakers), including by:

(a) combining individual loudspeaker dynamics processing configuration data (such as limit thresholds (playback limit thresholds) of the individual loudspeakers, thereby determining listening environment dynamics processing configuration data for the plurality of loudspeakers (such as combined thresholds);

(b) performing dynamics processing on the audio (e.g., the stream(s) of audio indicative of a spatial audio mix) using the listening environment dynamics processing configuration data for the plurality of loudspeakers (e.g., the combined thresholds) to generate processed audio; and (c) rendering the processed audio to speaker feeds.

In some embodiments, the audio processing includes (d) performing dynamics processing on the rendered audio signals according to the individual loudspeaker dynamics processing configuration data for each loudspeaker (e.g., limiting the speaker feeds according to the playback limit thresholds associated with the corresponding speakers, thereby generating limited speaker feeds).

The speakers may be speakers of (or coupled to) at least one (e.g., all or some) of the smart audio devices of a set of smart audio devices. In some implementations, to generate the limited speaker feeds in step (d), the speaker feeds generated in step (c) may be processed by a second stage of dynamics processing (e.g., by each speaker's associated dynamics processing system), e.g., to generate the limited (i.e., dynamically limited) speaker feeds prior to their final playback over the speakers. For example, the speaker feeds (or a subset or portion thereof) may be provided to a dynamics processing system of each different one of the speakers (e.g., a dynamics processing subsystem of a smart audio device, where the smart audio device includes or is coupled to the relevant one of the speakers), and the processed audio output from each said dynamics processing system may be used to generate a limited speaker feed (e.g., a dynamically limited speaker feed) for the relevant one of the speakers. Following the speaker-specific dynamics processing (in other words, the independently performed dynamics processing for each of the speakers), the processed (e.g., dynamically limited) speaker feeds may be used to drive the speakers to cause playback of sound.

The first stage of dynamics processing (in step (b)) may be designed to reduce a perceptually distracting shift in spatial balance which would otherwise result if steps (a) and (b) were omitted, and the dynamics processed (e.g., limited) speaker feeds resulting from step (d) were generated in response to the original audio (rather than in response to the processed audio generated in step (b)). This may prevent an undesirable shift in the spatial balance of a mix. The second stage of dynamics processing in step (d) operating on rendered speaker feeds from step (c) may be designed to ensure that no speaker distorts, because the dynamics processing of step (b) may not necessarily guarantee that signal levels have been reduced below the thresholds of all speakers. The combining of individual loudspeaker dynamics processing configuration data (e.g., the combination of thresholds in the first stage (step (a)) may, in some examples, involve (e.g., include) a step of averaging the individual loudspeaker dynamics processing configuration data (e.g., the limit thresholds) across the speakers (e.g., across smart audio devices), or taking the minimum of the individual loudspeaker dynamics processing configuration data (e.g., the limit thresholds) across the speakers (e.g., across smart audio devices).

In some implementations, when the first stage of dynamics processing (in step (b)) operates on audio indicative of a spatial mix (e.g., audio of an object-based audio program, including at least one object channel and optionally also at least one speaker channel), this first stage may be implemented according to a technique for audio object processing through use of spatial zones. In such a case, the combined individual loudspeaker dynamics processing configuration data (e.g., combined limit thresholds) associated with each of the zones may be derived by (or as) a weighted average of individual loudspeaker dynamics processing configuration data (e.g., individual speaker limit thresholds), and this weighting may be given or determined, at least in part, by each speaker's spatial proximity to and/or position within, the zone.

In a class of embodiments, an audio rendering system may render at least one audio stream (e.g., a plurality of audio streams for simultaneous playback), and/or play the rendered stream(s) over a plurality of arbitrarily placed loudspeakers, wherein at least one (e.g., two or more) of said program stream(s) is (or determines) a spatial mix.

Aspects of the present disclosure may include a system configured (e.g., programmed) to perform one or more disclosed methods or steps thereof, and a tangible, non-transitory, computer readable medium which implements non-transitory storage of data (for example, a disc or other tangible storage medium) which stores code for performing (e.g., code executable to perform) one or more disclosed methods or steps thereof. For example, some embodiments can be or include a programmable general purpose processor, digital signal processor, or microprocessor, programmed with software or firmware and/or otherwise configured to perform any of a variety of operations on data, including one or more disclosed methods or steps thereof. Such a general purpose processor may be or include a computer system including an input device, a memory, and a processing subsystem that is programmed (and/or otherwise configured) to perform one or more disclosed methods (or steps thereof) in response to data asserted thereto.

At least some aspects of the present disclosure may be implemented via methods, such as audio processing methods. In some instances, the methods may be implemented, at least in part, by a control system such as those disclosed herein. Some such methods involve obtaining, by a control system and via an interface system, individual loudspeaker dynamics processing configuration data for each of a plurality of loudspeakers of a listening environment. In some instances, the individual loudspeaker dynamics processing configuration data for one or more loudspeakers of the plurality of loudspeakers may correspond with one or more capabilities of the one or more loudspeakers. In some examples, the individual loudspeaker dynamics processing configuration data includes an individual loudspeaker dynamics processing configuration data set for each loudspeaker of the plurality of loudspeakers. Some such methods involve determining, by the control system, listening environment dynamics processing configuration data for the plurality of loudspeakers. In some examples, determining the listening environment dynamics processing configuration data is based on the individual loudspeaker dynamics processing configuration data set for each loudspeaker of the plurality of loudspeakers.

Some such methods involve receiving, by the control system and via the interface system, audio data including one or more audio signals and associated spatial data. In some examples, the spatial data includes channel data and/or spatial metadata. Some such methods involve performing dynamics processing, by the control system, on the audio data based on the listening environment dynamics processing configuration data, to generate processed audio data. Some such methods involve rendering, by the control system, the processed audio data for reproduction via a set of loudspeakers that includes at least some of the plurality of loudspeakers, to produce rendered audio signals. Some such methods involve providing, via the interface system, the rendered audio signals to the set of loudspeakers.

In some examples, the individual loudspeaker dynamics processing configuration data may include a playback limit threshold data set for each loudspeaker of the plurality of loudspeakers. The playback limit threshold data set may, for example, include playback limit thresholds for each of a plurality of frequencies.

According to some examples, determining the listening environment dynamics processing configuration data may involve determining minimum playback limit thresholds across the plurality of loudspeakers. In some instances, determining the listening environment dynamics processing configuration data may involve averaging the playback limit thresholds across the plurality of loudspeakers. In some examples, determining the listening environment dynamics processing configuration data may involve averaging the playback limit thresholds to obtain averaged playback limit thresholds across the plurality of loudspeakers, determining minimum playback limit thresholds across the plurality of loudspeakers and interpolating between the minimum playback limit thresholds and the averaged playback limit thresholds. In some such examples, averaging the playback limit thresholds may involve determining a weighted average of the playback limit thresholds. According to some implementations, the weighted average may be based, at least in part, on characteristics of a rendering process implemented by the control system.

In some examples, performing dynamics processing on the audio data may be based on spatial zones, each of the spatial zones corresponding to a subset of the listening environment. According to some such examples, the weighted average of the playback limit thresholds may be based, at least in part, on activation of loudspeakers by the rendering process as a function of audio signal proximity to the spatial zones. In some examples, the weighted average may be based, at least in part, on a loudspeaker participation value for each loudspeaker in each of the spatial zones. According to some such examples, each loudspeaker participation value may be based, at least in part, on one or more nominal spatial positions within each of the spatial zones. In some such examples, the nominal spatial positions correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the spatial zones.

According to some implementations, a method also may involve performing dynamics processing on the rendered audio signals according to the individual loudspeaker dynamics processing configuration data for each loudspeaker of the set of loudspeakers to which the rendered audio signals are provided.

In some examples, rendering the processed audio data may involve determining relative activation of the set of loudspeakers according to one or more dynamically configurable functions. The one or more dynamically configurable functions may, for example, be based on one or more properties of the audio signals, one or more properties of the set of loudspeakers, and/or one or more external inputs.

According to some implementations, performing dynamics processing on the audio data may be based on spatial zones. Each of the spatial zones may correspond to a subset of the listening environment. In some such implementations, the dynamics processing may be performed separately for each of the spatial zones. In some instances, determining the listening environment dynamics processing configuration data may be performed separately for each of the spatial zones.

In some examples, the individual loudspeaker dynamics processing configuration data may include, for each loudspeaker of the plurality of loudspeakers, a dynamic range compression data set. According to some such examples, the dynamic range compression data set may include threshold data, input/output ratio data, attack data, release data and/or knee data.

According to some implementations, determining the listening environment dynamics processing configuration data may be based, at least in part, on combining the dynamics processing configuration data sets across the plurality of loudspeakers. In some examples, combining the dynamics processing configuration data sets across the plurality of loudspeakers may be based, as least in part, on characteristics of a rendering process implemented by the control system.

In some such examples, performing dynamics processing on the audio data may be based on one or more spatial zones. Each of the one or more spatial zones may correspond to the entirety of, or a subset of, the listening environment. In some such examples, combining the dynamics processing configuration data sets across the plurality of loudspeakers may be performed separately for each of the one or more spatial zones. In some such examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

According to some such examples, combining the dynamics processing configuration data sets across the plurality of loudspeakers separately for each of the one or more spatial zones may be based, at least in part, on a loudspeaker participation value for each loudspeaker in each of the one or more spatial zones. In some such examples, each loudspeaker participation value may be based, at least in part, on one or more nominal spatial positions within each of the one or more spatial zones. In some such examples, the nominal spatial positions may correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the one or more spatial zones.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves obtaining, by a control system and via an interface system, individual loudspeaker dynamics processing configuration data for each of a plurality of loudspeakers of a listening environment. In some instances, the individual loudspeaker dynamics processing configuration data for one or more loudspeakers of the plurality of loudspeakers may correspond with one or more capabilities of the one or more loudspeakers. In some examples, the individual loudspeaker dynamics processing configuration data includes an individual loudspeaker dynamics processing configuration data set for each loudspeaker of the plurality of loudspeakers. Some such methods involve determining, by the control system, listening environment dynamics processing configuration data for the plurality of loudspeakers. In some examples, determining the listening environment dynamics processing configuration data is based on the individual loudspeaker dynamics processing configuration data set for each loudspeaker of the plurality of loudspeakers.

Some such methods involve receiving, by the control system and via the interface system, audio data including one or more audio signals and associated spatial data. In some examples, the spatial data includes channel data and/or spatial metadata. Some such methods involve performing dynamics processing, by the control system, on the audio data based on the listening environment dynamics processing configuration data, to generate processed audio data. Some such methods involve rendering, by the control system, the processed audio data for reproduction via a set of loudspeakers that includes at least some of the plurality of loudspeakers, to produce rendered audio signals. Some such methods involve providing, via the interface system, the rendered audio signals to the set of loudspeakers.

In some examples, the individual loudspeaker dynamics processing configuration data may include a playback limit threshold data set for each loudspeaker of the plurality of loudspeakers. The playback limit threshold data set may, for example, include playback limit thresholds for each of a plurality of frequencies.

According to some examples, determining the listening environment dynamics processing configuration data may involve determining minimum playback limit thresholds across the plurality of loudspeakers. In some instances, determining the listening environment dynamics processing configuration data may involve averaging the playback limit thresholds across the plurality of loudspeakers. In some examples, determining the listening environment dynamics processing configuration data may involve averaging the playback limit thresholds to obtain averaged playback limit thresholds across the plurality of loudspeakers, determining minimum playback limit thresholds across the plurality of loudspeakers and interpolating between the minimum playback limit thresholds and the averaged playback limit thresholds. In some such examples, averaging the playback limit thresholds may involve determining a weighted average of the playback limit thresholds. According to some implementations, the weighted average may be based, at least in part, on characteristics of a rendering process implemented by the control system.

In some examples, performing dynamics processing on the audio data may be based on spatial zones, each of the spatial zones corresponding to a subset of the listening environment. According to some such examples, the weighted average of the playback limit thresholds may be based, at least in part, on activation of loudspeakers by the rendering process as a function of audio signal proximity to the spatial zones. In some examples, the weighted average may be based, at least in part, on a loudspeaker participation value for each loudspeaker in each of the spatial zones. According to some such examples, each loudspeaker participation value may be based, at least in part, on one or more nominal spatial positions within each of the spatial zones. In some such examples, the nominal spatial positions correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the spatial zones.

According to some implementations, a method also may involve performing dynamics processing on the rendered audio signals according to the individual loudspeaker dynamics processing configuration data for each loudspeaker of the set of loudspeakers to which the rendered audio signals are provided.

In some examples, rendering the processed audio data may involve determining relative activation of the set of loudspeakers according to one or more dynamically configurable functions. The one or more dynamically configurable functions may, for example, be based on one or more properties of the audio signals, one or more properties of the set of loudspeakers, and/or one or more external inputs.

According to some implementations, performing dynamics processing on the audio data may be based on spatial zones. Each of the spatial zones may correspond to a subset of the listening environment. In some such implementations, the dynamics processing may be performed separately for each of the spatial zones. In some instances, determining the listening environment dynamics processing configuration data may be performed separately for each of the spatial zones.

In some examples, the individual loudspeaker dynamics processing configuration data may include, for each loudspeaker of the plurality of loudspeakers, a dynamic range compression data set. According to some such examples, the dynamic range compression data set may include threshold data, input/output ratio data, attack data, release data and/or knee data.

According to some implementations, determining the listening environment dynamics processing configuration data may be based, at least in part, on combining the dynamics processing configuration data sets across the plurality of loudspeakers. In some examples, combining the dynamics processing configuration data sets across the plurality of loudspeakers may be based, as least in part, on characteristics of a rendering process implemented by the control system.

In some such examples, performing dynamics processing on the audio data may be based on one or more spatial zones. Each of the one or more spatial zones may correspond to the entirety of, or a subset of, the listening environment. In some such examples, combining the dynamics processing configuration data sets across the plurality of loudspeakers may be performed separately for each of the one or more spatial zones. In some such examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

According to some such examples, combining the dynamics processing configuration data sets across the plurality of loudspeakers separately for each of the one or more spatial zones may be based, at least in part, on a loudspeaker participation value for each loudspeaker in each of the one or more spatial zones. In some such examples, each loudspeaker participation value may be based, at least in part, on one or more nominal spatial positions within each of the one or more spatial zones. In some such examples, the nominal spatial positions may correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the one or more spatial zones.

In some implementations, an apparatus may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system may be configured for performing one or more of the methods disclosed herein. Some such methods may involve obtaining, by the control system and via an interface system, individual loudspeaker dynamics processing configuration data for each of a plurality of loudspeakers of a listening environment. In some instances, the individual loudspeaker dynamics processing configuration data for one or more loudspeakers of the plurality of loudspeakers may correspond with one or more capabilities of the one or more loudspeakers. In some examples, the individual loudspeaker dynamics processing configuration data includes an individual loudspeaker dynamics processing configuration data set for each loudspeaker of the plurality of loudspeakers. Some such methods involve determining, by the control system, listening environment dynamics processing configuration data for the plurality of loudspeakers. In some examples, determining the listening environment dynamics processing configuration data is based on the individual loudspeaker dynamics processing configuration data set for each loudspeaker of the plurality of loudspeakers.

Some such methods involve receiving, by the control system and via the interface system, audio data including one or more audio signals and associated spatial data. In some examples, the spatial data includes channel data and/or spatial metadata. Some such methods involve performing dynamics processing, by the control system, on the audio data based on the listening environment dynamics processing configuration data, to generate processed audio data. Some such methods involve rendering, by the control system, the processed audio data for reproduction via a set of loudspeakers that includes at least some of the plurality of loudspeakers, to produce rendered audio signals. Some such methods involve providing, via the interface system, the rendered audio signals to the set of loudspeakers.

In some examples, the individual loudspeaker dynamics processing configuration data may include a playback limit threshold data set for each loudspeaker of the plurality of loudspeakers. The playback limit threshold data set may, for example, include playback limit thresholds for each of a plurality of frequencies.

According to some examples, determining the listening environment dynamics processing configuration data may involve determining minimum playback limit thresholds across the plurality of loudspeakers. In some instances, determining the listening environment dynamics processing configuration data may involve averaging the playback limit thresholds across the plurality of loudspeakers. In some examples, determining the listening environment dynamics processing configuration data may involve averaging the playback limit thresholds to obtain averaged playback limit thresholds across the plurality of loudspeakers, determining minimum playback limit thresholds across the plurality of loudspeakers and interpolating between the minimum playback limit thresholds and the averaged playback limit thresholds. In some such examples, averaging the playback limit thresholds may involve determining a weighted average of the playback limit thresholds. According to some implementations, the weighted average may be based, at least in part, on characteristics of a rendering process implemented by the control system.

In some examples, performing dynamics processing on the audio data may be based on spatial zones, each of the spatial zones corresponding to a subset of the listening environment. According to some such examples, the weighted average of the playback limit thresholds may be based, at least in part, on activation of loudspeakers by the rendering process as a function of audio signal proximity to the spatial zones. In some examples, the weighted average may be based, at least in part, on a loudspeaker participation value for each loudspeaker in each of the spatial zones. According to some such examples, each loudspeaker participation value may be based, at least in part, on one or more nominal spatial positions within each of the spatial zones. In some such examples, the nominal spatial positions correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the spatial zones.

According to some implementations, a method also may involve performing dynamics processing on the rendered audio signals according to the individual loudspeaker dynamics processing configuration data for each loudspeaker of the set of loudspeakers to which the rendered audio signals are provided.

In some examples, rendering the processed audio data may involve determining relative activation of the set of loudspeakers according to one or more dynamically configurable functions. The one or more dynamically configurable functions may, for example, be based on one or more properties of the audio signals, one or more properties of the set of loudspeakers, and/or one or more external inputs.

According to some implementations, performing dynamics processing on the audio data may be based on spatial zones. Each of the spatial zones may correspond to a subset of the listening environment. In some such implementations, the dynamics processing may be performed separately for each of the spatial zones. In some instances, determining the listening environment dynamics processing configuration data may be performed separately for each of the spatial zones.

In some examples, the individual loudspeaker dynamics processing configuration data may include, for each loudspeaker of the plurality of loudspeakers, a dynamic range compression data set. According to some such examples, the dynamic range compression data set may include threshold data, input/output ratio data, attack data, release data and/or knee data.

According to some implementations, determining the listening environment dynamics processing configuration data may be based, at least in part, on combining the dynamics processing configuration data sets across the plurality of loudspeakers. In some examples, combining the dynamics processing configuration data sets across the plurality of loudspeakers may be based, as least in part, on characteristics of a rendering process implemented by the control system.

In some such examples, performing dynamics processing on the audio data may be based on one or more spatial zones. Each of the one or more spatial zones may correspond to the entirety of, or a subset of, the listening environment. In some such examples, combining the dynamics processing configuration data sets across the plurality of loudspeakers may be performed separately for each of the one or more spatial zones. In some such examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

According to some such examples, combining the dynamics processing configuration data sets across the plurality of loudspeakers separately for each of the one or more spatial zones may be based, at least in part, on a loudspeaker participation value for each loudspeaker in each of the one or more spatial zones. In some such examples, each loudspeaker participation value may be based, at least in part, on one or more nominal spatial positions within each of the one or more spatial zones. In some such examples, the nominal spatial positions may correspond to canonical locations of channels, such as canonical locations of channels in a Dolby 5.1, Dolby 5.1.2, Dolby 7.1, Dolby 7.1.4 or Dolby 9.1 surround sound mix. In some instances, each loudspeaker participation value may be based, at least in part, on an activation of each loudspeaker corresponding to rendering of audio data at each of the one or more nominal spatial positions within each of the one or more spatial zones.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1:
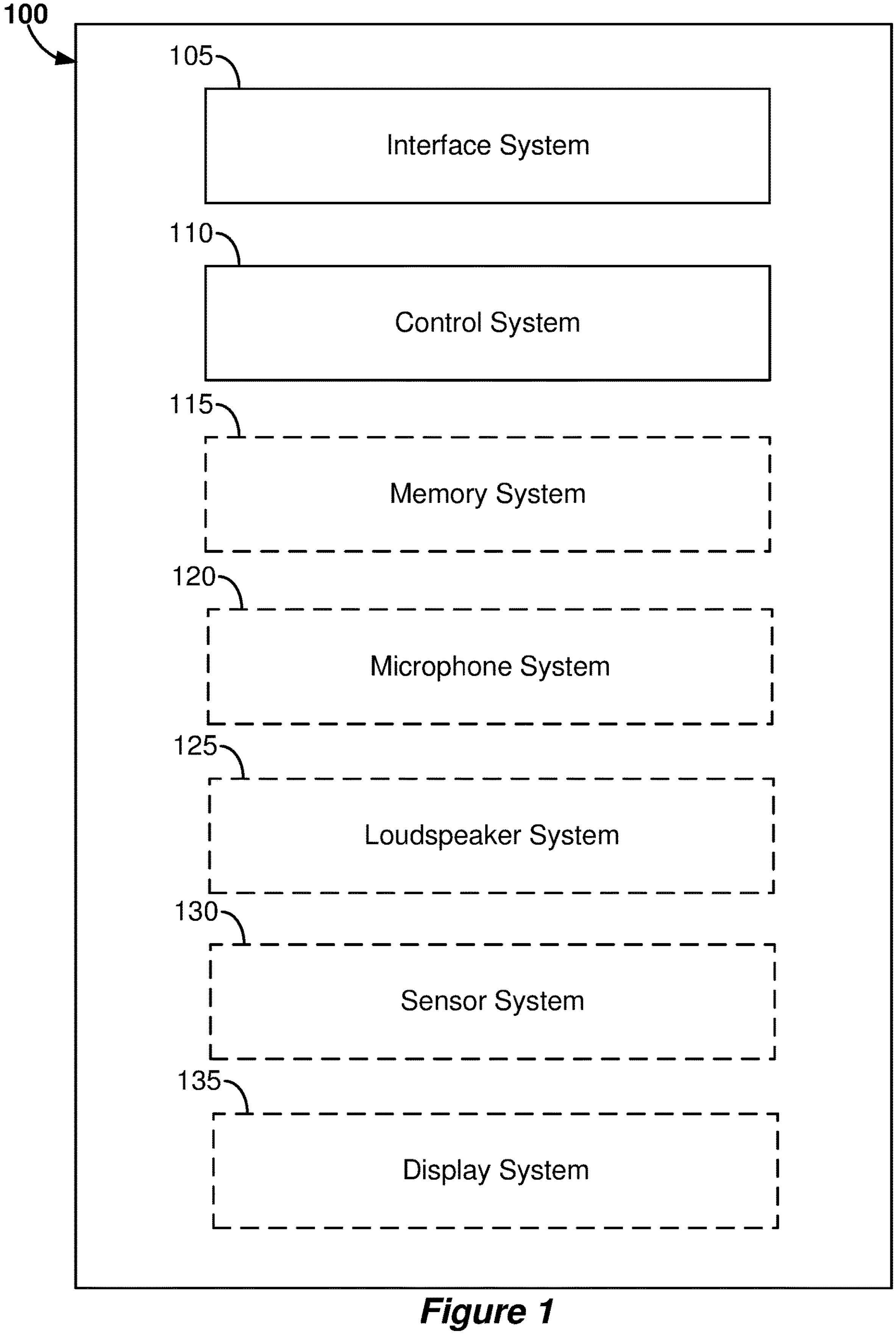
FIG. 1 is a block diagram that shows examples of components of an apparatus capable of implementing various aspects of this disclosure.

FIG. 1 is a block diagram that shows examples of components of an apparatus capable of implementing various aspects of this disclosure. As with other figures provided herein, the types and numbers of elements shown in FIG. 1 are merely provided by way of example. Other implementations may include more, fewer and/or different types and numbers of elements. According to some examples, the apparatus 100 may be, or may include, a smart audio device that is configured for performing at least some of the methods disclosed herein. In other implementations, the apparatus 100 may be, or may include, another device that is configured for performing at least some of the methods disclosed herein, such as a laptop computer, a cellular telephone, a tablet device, a smart home hub, etc. In some such implementations the apparatus 100 may be, or may include, a server.

In this example, the apparatus 100 includes an interface system 105 and a control system 110. The interface system 105 may, in some implementations, be configured for receiving audio data. The audio data may include audio signals that are scheduled to be reproduced by at least some speakers of an environment. The audio data may include one or more audio signals and associated spatial data. The spatial data may, for example, include channel data and/or spatial metadata. The interface system 105 may be configured for providing rendered audio signals to at least some loudspeakers of the set of loudspeakers of the environment. The interface system 105 may, in some implementations, be configured for receiving input from one or more microphones in an environment.

The interface system 105 may include one or more network interfaces and/or one or more external device interfaces (such as one or more universal serial bus (USB) interfaces). According to some implementations, the interface system 105 may include one or more wireless interfaces. The interface system 105 may include one or more devices for implementing a user interface, such as one or more microphones, one or more speakers, a display system, a touch sensor system and/or a gesture sensor system. In some examples, the interface system 105 may include one or more interfaces between the control system 110 and a memory system, such as the optional memory system 115 shown in FIG. 1. However, the control system 110 may include a memory system in some instances.

The control system 110 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 110 may reside in more than one device. For example, a portin of the control system 110 may reside in a device within one of the environments depicted herein and another portion of the control system 110 may reside in a device that is outside the environment, such as a server, a mobile device (e.g., a smartphone or a tablet computer), etc. In other examples, a portion of the control system 110 may reside in a device within one of the environments depicted herein and another portion of the control system 110 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 105 also may, in some such examples, reside in more than one device.

In some implementations, the control system 110 may be configured for performing, at least in part, the methods disclosed herein. According to some examples, the control system 110 may be configured for implementing methods of managing playback of multiple streams of audio over multiple speakers.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 115 shown in FIG. 1 and/or in the control system 110. Accordingly, various innovative aspects of the subject matter described in this disclosure can be implemented in one or more non-transitory media having software stored thereon. The software may, for example, include instructions for controlling at least one device to process audio data. The software may, for example, be executable by one or more components of a control system such as the control system 110 of FIG. 1.

In some examples, the apparatus 100 may include the optional microphone system 120 shown in FIG. 1. The optional microphone system 120 may include one or more microphones. In some implementations, one or more of the microphones may be part of, or associated with, another device, such as a speaker of the speaker system, a smart audio device, etc.

According to some implementations, the apparatus 100 may include the optional loudspeaker system 125 shown in FIG. 1. The optional speaker system 125 may include one or more loudspeakers. Loudspeakers may sometimes be referred to herein as "speakers." In some examples, at least some loudspeakers of the optional loudspeaker system 125 may be arbitrarily located. For example, at least some speakers of the optional loudspeaker system 125 may be placed in locations that do not correspond to any standard prescribed speaker layout, such as Dolby 5.1, Dolby 5.1.2, Dolby 7.1, Dolby 7.1.4, Dolby 9.1, Hamasaki 22.2, etc. In some such examples, at least some loudspeakers of the optional loudspeaker system 125 may be placed in locations that are convenient to the space (e.g., in locations where there is space to accommodate the loudspeakers), but not in any standard prescribed loudspeaker layout.

In some implementations, the apparatus 100 may include the optional sensor system 130 shown in FIG. 1. The optional sensor system 130 may include one or more cameras, touch sensors, gesture sensors, motion detectors, etc. According to some implementations, the optional sensor system 130 may include one or more cameras. In some implementations, the cameras may be free-standing cameras. In some examples, one or more cameras of the optional sensor system 130 may reside in a smart audio device, which may be a single purpose audio device or a virtual assistant. In some such examples, one or more cameras of the optional sensor system 130 may reside in a TV, a mobile phone or a smart speaker.

In some implementations, the apparatus 100 may include the optional display system 135 shown in FIG. 1. The optional display system 135 may include one or more displays, such as one or more light-emitting diode (LED) displays. In some instances, the optional display system 135 may include one or more organic light-emitting diode (OLED) displays. In some examples wherein the apparatus 100 includes the display system 135, the sensor system 130 may include a touch sensor system and/or a gesture sensor system proximate one or more displays of the display system 135. According to some such implementations, the control system 110 may be configured for controlling the display system 135 to present a graphical user interface (GUI), such as one of the GUIs disclosed herein.

According to some examples the apparatus 100 may be, or may include, a smart audio device. In some such implementations the apparatus 100 may be, or may include, a wakeword detector. For example, the apparatus 100 may be, or may include, a virtual assistant.

Figure 2:
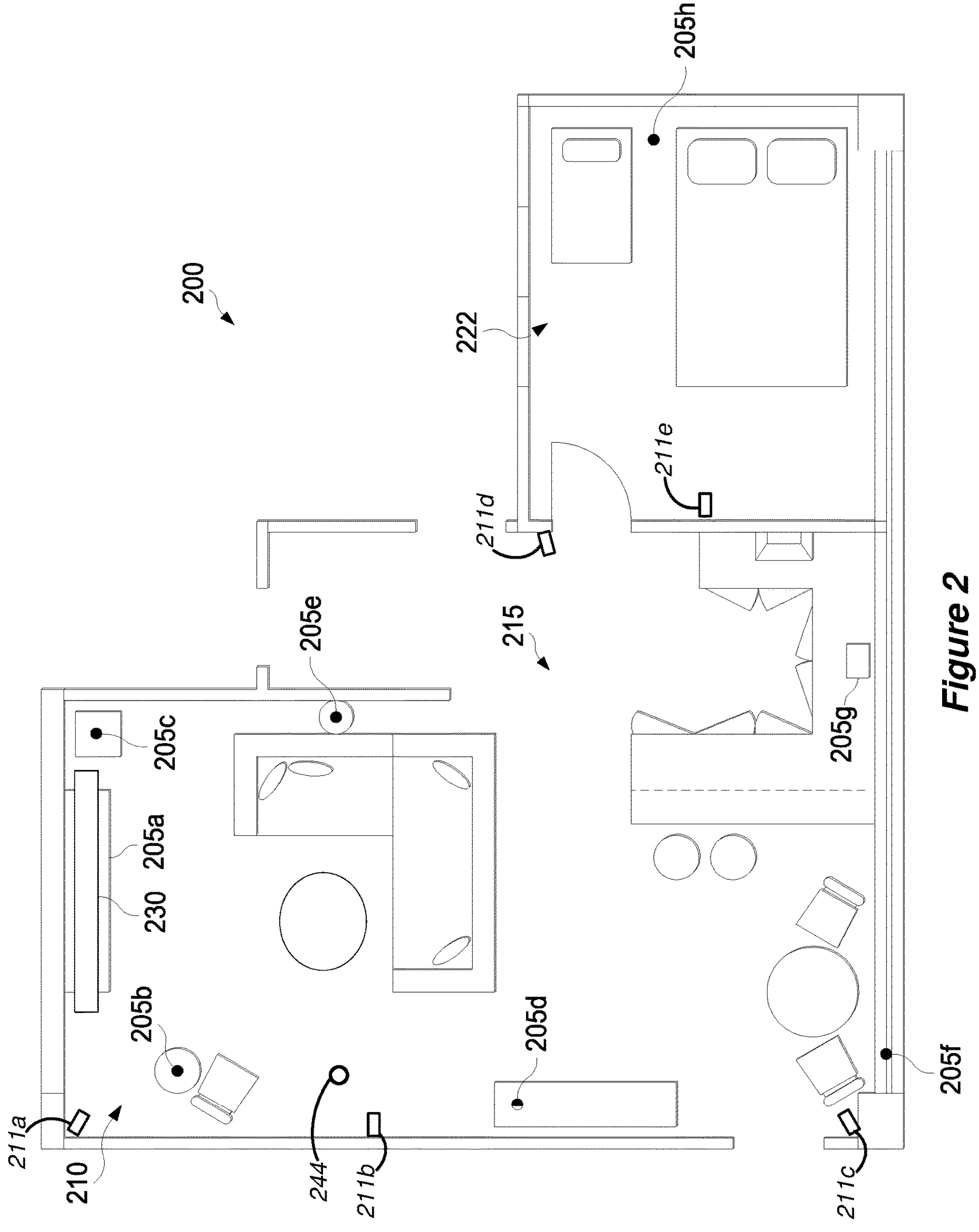
FIG. 2 depicts a floor plan of a listening environment, which is a living space in this example.

FIG. 2 depicts a floor plan of a listening environment, which is a living space in this example. As with other figures provided herein, the types and numbers of elements shown in FIG. 2 are merely provided by way of example. Other implementations may include more, fewer and/or different types and numbers of elements. According to this example, the environment 200 includes a living room 210 at the upper left, a kitchen 215 at the lower center, and a bedroom 222 at the lower right. Boxes and circles distributed across the living space represent a set of loudspeakers 205*a*-205*h*, at least some of which may be smart speakers in some implementations, placed in locations convenient to the space, but not adhering to any standard prescribed layout (arbitrarily placed). In some examples, the loudspeakers 205*a*-205*h* may be coordinated to implement one or more disclosed embodiments.

According to some examples, the environment 200 may include a smart home hub for implementing at least some of the disclosed methods. According to some such implementations, the smart home hub may include at least a portion of the above-described control system 110. In some examples, a smart device (such as a smart speaker, a mobile phone, a smart television, a device used to implement a virtual assistant, etc.) may implement the smart home hub.

In this example, the environment 200 includes cameras 211*a*-211*e*, which are distributed throughout the environment. In some implementations, one or more smart audio devices in the environment 200 also may include one or more cameras. The one or more smart audio devices may be single purpose audio devices or virtual assistants. In some such examples, one or more cameras of the optional sensor system 130 may reside in or on the television 230, in a mobile phone or in a smart speaker, such as one or more of the loudspeakers 205*b*, 205*d*, 205*e* or 205*h*. Although cameras 211*a*-211*e* are not shown in every depiction of the environment 200 presented in this disclosure, each of the environments 200 may nonetheless include one or more cameras in some implementations.

In flexible rendering, spatial audio may be rendered over an arbitrary number of arbitrarily placed speakers. With the widespread deployment of smart audio devices (e.g., smart speakers) in the home, there is need for realizing flexible rendering technology which allows consumers to perform flexible rendering of audio, and playback of the so-rendered audio, using smart audio devices.

Several technologies have been developed to implement flexible rendering, including: Center of Mass Amplitude Panning (CMAP), and Flexible Virtualization (FV).

In the context of performing rendering (or rendering and playback) of a spatial audio mix (e.g., rendering of a stream of audio or multiple streams of audio) for playback by the smart audio devices of a set of smart audio devices (or by another set of speakers), the types of speakers (e.g., in, or coupled to, smart audio devices) might be varied, and the corresponding acoustics capabilities of the speakers might therefore vary quite significantly. In the example shown in FIG. 2, the loudspeakers 205*d*, 205*f* and 205*h* are smart speakers with a single 0.6-inch speaker. In this example, loudspeakers 205*b*, 205*c*, 205*e* and 205*f* are smart speakers having a 2.5-inch woofer and a 0.8-inch tweeter. According to this example, the loudspeaker 205*g* is a smart speaker with a 5.25-inch woofer, three 2-inch midrange speakers and a 1.0-inch tweeter. Here, the loudspeaker 205*a* is a sound bar having sixteen 1.1-inch beam drivers and two 4-inch woofers. Accordingly, the low-frequency capability of smart speakers 205*d* and 205*f* is significantly less than that of the other loudspeakers in the environment 200, particular those having 4-inch or 5.25-inch woofers.

Figure 3:
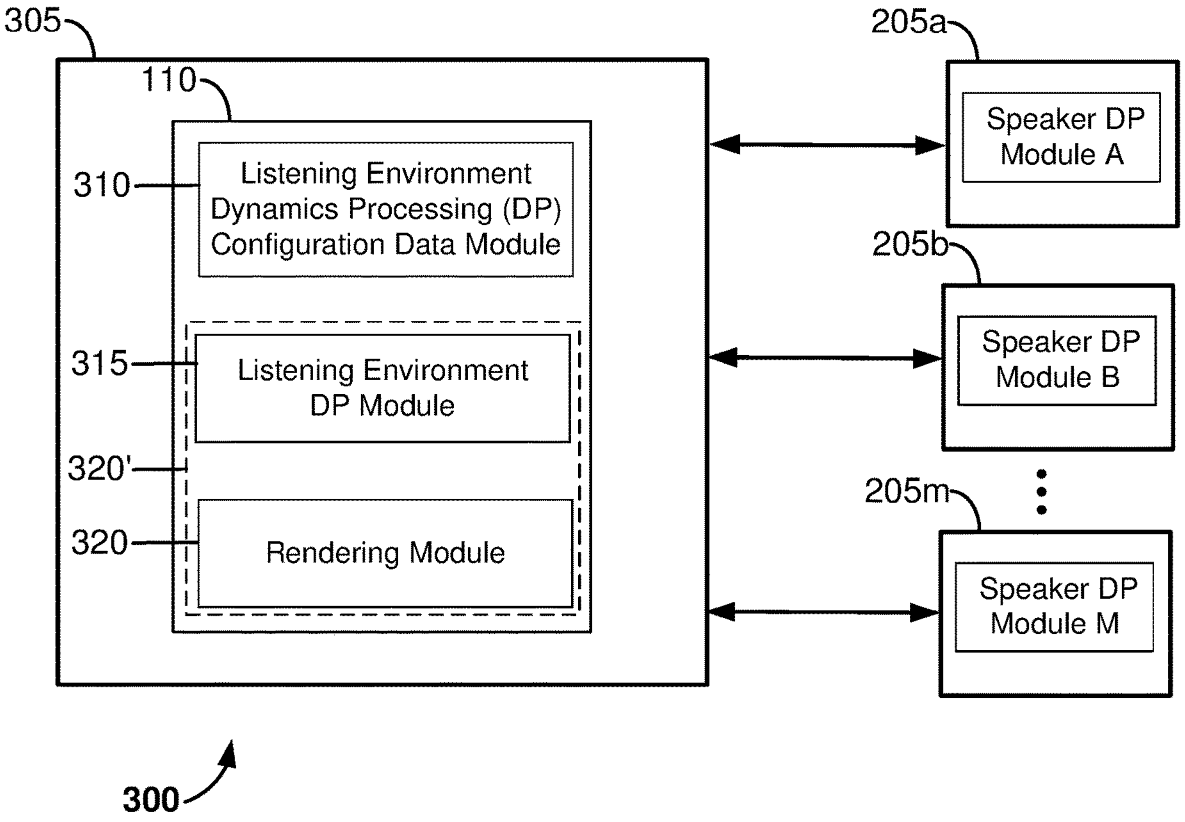
FIG. 3 is a block diagram that shows examples of components of a system capable of implementing various aspects of this disclosure.

FIG. 3 is a block diagram that shows examples of components of a system capable of implementing various aspects of this disclosure. As with other figures provided herein, the types and numbers of elements shown in FIG. 1 are merely provided by way of example. Other implementations may include more, fewer and/or different types and numbers of elements.

According to this example, the system 300 includes a smart home hub 305 and loudspeakers 205*a* through 205*m*. In this example, the smart home hub 305 includes an instance of the control system 110 that is shown in FIG. 1 and described above. According to this implementation, the control system 110 includes a listening environment dynamics processing configuration data module 310, a listening environment dynamics processing module 315 and a rendering module 320. Some examples of the listening environment dynamics processing configuration data module 310, the listening environment dynamics processing module 315 and the rendering module 320 are described below. In some examples, a rendering module 320' may be configured for both rendering and listening environment dynamics processing.

As suggested by the arrows between the smart home hub 305 and the loudspeakers 205*a* through 205*m*, the smart home hub 305 also includes an instance of the interface system 105 that is shown in FIG. 1 and described above. According to some examples, the smart home hub 305 may be part of the environment 200 shown in FIG. 2. In some instances, the smart home hub 305 may be implemented by a smart speaker, a smart television, a cellular telephone, a laptop, etc. In some implementations, the smart home hub 305 may be implemented by software, e.g., via software of a downloadable software application or "app." In some instances, the smart home hub 305 may be implemented in each of the loudspeakers 205*a-m*, all operating in parallel to generate the same processed audio signals from module 320. According to some such examples, in each of the loudspeakers the rendering module 320 may then generate one or more speaker feeds relevant to each loudspeaker, or group of loudspeakers, and may provide these speaker feeds to each speaker dynamics processing module.

In some instances, the loudspeakers 205*a* through 205*m* may include the loudspeakers 205*a* through 205*h* of FIG. 2, whereas in other examples the loudspeakers 205*a* through 205*m* may be, or may include other loudspeakers. Accordingly, in this example the system 300 includes M loudspeakers, where M is an integer greater than 2.

Smart speakers, as well as many other powered speakers, typically employ some type of internal dynamics processing to prevent the speakers from distorting. Often associated with such dynamics processing are signal limit thresholds (e.g., limit thresholds, which are variable across frequency), below which the signal level is dynamically held. For example, Dolby's Audio Regulator, one of several algorithms in the Dolby Audio Processing (DAP) audio post-processing suite, provides such processing. In some instances, but not typically via a smart speaker's dynamics processing module, dynamics processing also may involve applying one or more compressors, gates, expanders, duckers, etc.

Accordingly, in this example each of the loudspeakers 205*a* through 205*m* includes a corresponding speaker dynamics processing (DP) module A through M. The speaker dynamics processing modules are configured to apply individual loudspeaker dynamics processing configuration data for each individual loudspeaker of a listening environment. The speaker DP module A, for example, is configured to apply individual loudspeaker dynamics processing configuration data that is appropriate for the loudspeaker 205*a*. In some examples, the individual loudspeaker dynamics processing configuration data may correspond with one of more capabilities of the individual loudspeaker, such as the loudspeaker's ability to reproduce audio data within a particular frequency range and at a particular level without appreciable distortion.

When spatial audio is rendered across a set of heterogeneous speakers (e.g., speakers of, or coupled to, smart audio devices), each with potentially different playback limits, care must be taken in performing dynamics processing on the overall mix. A simple solution is to render the spatial mix to speaker feeds for each of the participating speakers and then allow the dynamics processing module associated with each speaker to operate independently on its corresponding speaker feed, according to the limits of that speaker.

While this approach will keep each speaker from distorting, it may dynamically shift the spatial balance of the mix in a perceptually distracting manner For example, referring to FIG. 2, suppose that a television program is being shown on the television 230 and that corresponding audio is being reproduced by the loudspeakers of the environment 200. Suppose that during the television program, audio associated with a stationary object (such as a unit of heavy machinery in a factory) is intended to be rendered to the position 244. Suppose further that a dynamics processing module associated with the loudspeaker 205*d* reduces the level for audio in the bass range substantially more than a dynamics processing module associated with the loudspeaker 205*b* does, because of the substantially greater capability of the loudspeaker 205*b* to reproduce sounds in the bass range. If the volume of a signal associated with the stationary object fluctuates, when the volume is higher the dynamics processing module associated with the loudspeaker 205*d* will cause the level for audio in the bass range to be reduced substantially more than the level for the same audio will be reduced by the dynamics processing module associated with the loudspeaker 205*b*. This difference in level will cause the apparent location of the stationary object to change. An improved solution is therefore needed.

Some embodiments of the present disclosure are systems and methods for rendering (or rendering and playback) of a spatial audio mix (e.g., rendering of a stream of audio or multiple streams of audio) for playback by at least one (e.g., all or some) of the smart audio devices of a set of smart audio devices (e.g., a set of coordinated smart audio devices), and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds). Examples of such embodiments include the following:

Systems and methods for audio processing may include rendering audio (e.g., rendering a spatial audio mix, for example by rendering a stream of audio or multiple streams of audio) for playback by at least two speakers (e.g., all or some of the speakers of a set of speakers), including by:

(a) combining individual loudspeaker dynamics processing configuration data (such as limit thresholds (playback limit thresholds) of the individual loudspeakers, thereby determining listening environment dynamics processing configuration data for the plurality of loudspeakers (such as combined thresholds);

(b) performing dynamics processing on the audio (e.g., the stream(s) of audio indicative of a spatial audio mix) using the listening environment dynamics processing configuration data for the plurality of loudspeakers (e.g., the combined thresholds) to generate processed audio; and (c) rendering the processed audio to speaker feeds.

According to some implementations, process (a) may be performed by a module such as the listening environment dynamics processing configuration data module 310 shown in FIG. 3. The smart home hub 305 may be configured for obtaining, via an interface system, individual loudspeaker dynamics processing configuration data for each of the M loudspeakers. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data. In some examples, the smart home hub 305 may be configured for obtaining the individual loudspeaker dynamics processing configuration data sets by querying each of the loudspeakers 205*a*-205*m*. In other implementations, the smart home hub 305 may be configured for obtaining the individual loudspeaker dynamics processing configuration data sets by querying a data structure of previously-obtained individual loudspeaker dynamics processing configuration data sets that are stored in a memory.

In some examples, process (b) may be performed by a module such as the listening environment dynamics processing module 315 of FIG. 3. Some detailed examples of processes (a) and (b) are described below.

In some examples, the rendering of process (c) may be performed by a module such as the rendering module 320 or the rendering module 320' of FIG. 3. In some embodiments, the audio processing may involve:

(d) performing dynamics processing on the rendered audio signals according to the individual loudspeaker dynamics processing configuration data for each loudspeaker (e.g., limiting the speaker feeds according to the playback limit thresholds associated with the corresponding speakers, thereby generating limited speaker feeds). Process (d) may, for example, be performed by the dynamics processing modules A through M shown in FIG. 3.

The speakers may include speakers of (or coupled to) at least one (e.g., all or some) of the smart audio devices of a set of smart audio devices. In some implementations, to generate the limited speaker feeds in step (d), the speaker feeds generated in step (c) may be processed by a second stage of dynamics processing (e.g., by each speaker's associated dynamics processing system), e.g., to generate the speaker feeds prior to their final playback over the speakers. For example, the speaker feeds (or a subset or portion thereof) may be provided to a dynamics processing system of each different one of the speakers (e.g., a dynamics processing subsystem of a smart audio device, where the smart audio device includes or is coupled to the relevant one of the speakers), and the processed audio output from each said dynamics processing system may be used to generate a speaker feed for the relevant one of the speakers. Following the speaker-specific dynamics processing (in other words, the independently performed dynamics processing for each of the speakers), the processed (e.g., dynamically limited) speaker feeds may be used to drive the speakers to cause playback of sound.

The first stage of dynamics processing (in step (b)) may be designed to reduce a perceptually distracting shift in spatial balance which would otherwise result if steps (a) and (b) were omitted, and the dynamics processed (e.g., limited) speaker feeds resulting from step (d) were generated in response to the original audio (rather than in response to the processed audio generated in step (b)). This may prevent an undesirable shift in the spatial balance of a mix. The second stage of dynamics processing operating on rendered speaker feeds from step (c) may be designed to ensure that no speaker distorts, because the dynamics processing of step (b) may not necessarily guarantee that signal levels have been reduced below the thresholds of all speakers. The combining of individual loudspeaker dynamics processing configuration data (e.g., the combination of thresholds in the first stage (step (a)) may, in some examples, involve (e.g., include) a step of averaging the individual loudspeaker dynamics processing configuration data (e.g., the limit thresholds) across the speakers (e.g., across smart audio devices), or taking the minimum of the individual loudspeaker dynamics processing configuration data (e.g., the limit thresholds) across the speakers (e.g., across smart audio devices).

In some implementations, when the first stage of dynamics processing (in step (b)) operates on audio indicative of a spatial mix (e.g., audio of an object-based audio program, including at least one object channel and optionally also at least one speaker channel), this first stage may be implemented according to a technique for audio object processing through use of spatial zones. In such a case, the combined individual loudspeaker dynamics processing configuration data (e.g., combined limit thresholds) associated with each of the zones may be derived by (or as) a weighted average of individual loudspeaker dynamics processing configuration data (e.g., individual speaker limit thresholds), and this weighting may be given or determined, at least in part, by each speaker's spatial proximity to and/or position within, the zone.

In an example embodiment we assume a plurality of M speakers ($M \geq 2$), where each speaker is indexed by the variable i. Associated with each speaker i is a set of frequency varying playback limit thresholds $T_i[f]$, where the variable $f$ represents an index into a finite set of frequencies at which the thresholds are specified. (Note that if the size of the set of frequencies is one then the corresponding single threshold may be considered broadband, applied across the entire frequency range). These thresholds are utilized by each speaker in its own independent dynamics processing function to limit the audio signal below the thresholds $T_i[f]$ for a particular purpose such as preventing the speaker from distorting or preventing the speaker from playing beyond some level deemed objectionable in its vicinity.

Figure 4A:
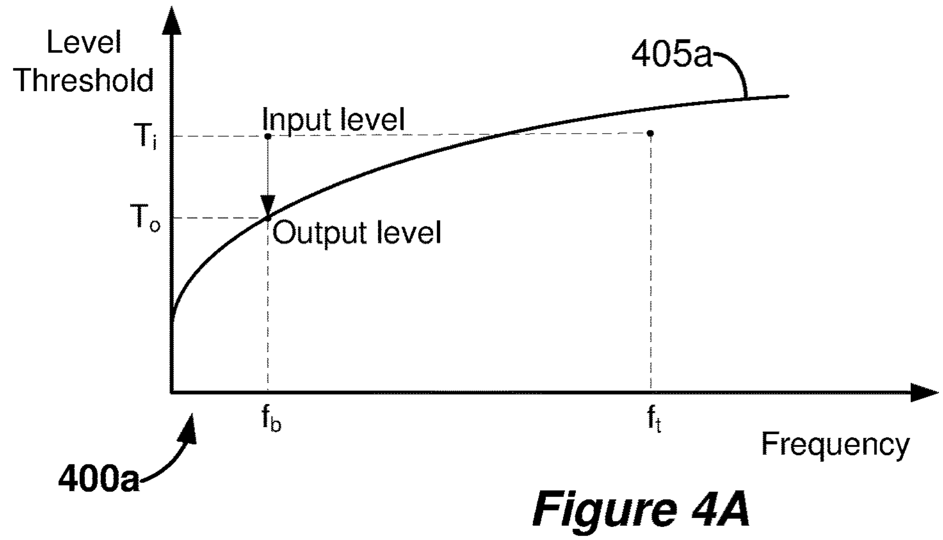
FIGS. 4A, 4B and 4C show examples of playback limit thresholds and corresponding frequencies.
Figure 4B:
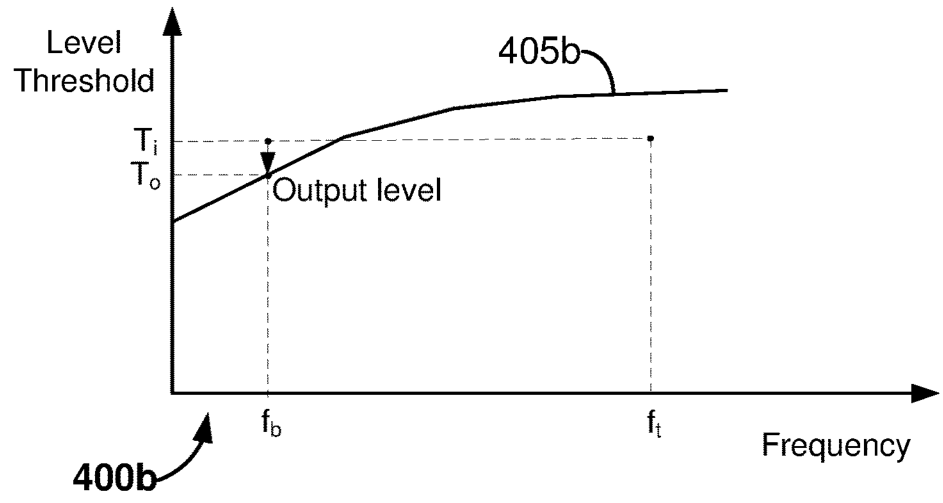
Figure 4C:
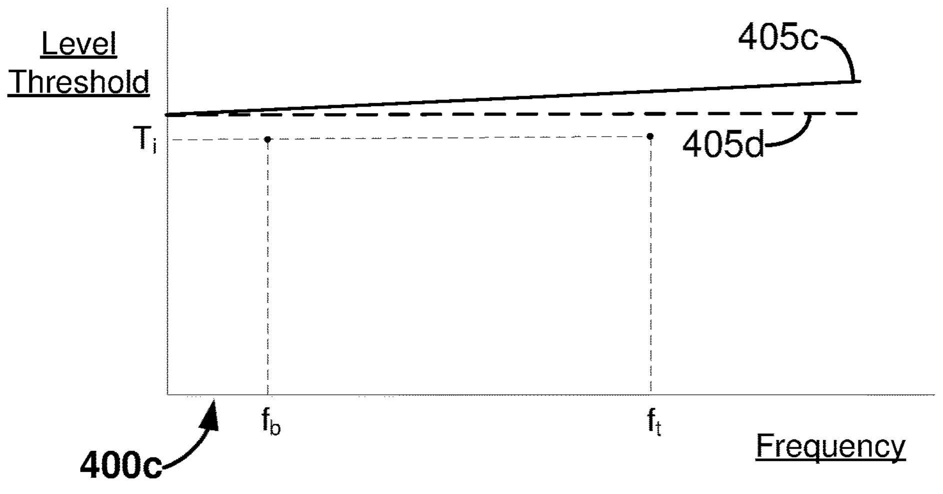

FIGS. 4A, 4B and 4C show examples of playback limit thresholds and corresponding frequencies. The range of frequencies shown may, for example, span the range of frequencies that are audible to the average human being (e.g., 20 Hz to 20 kHz). In these examples, the playback limit thresholds are indicated by the vertical axes of the graphs 400*a*, 400*b* and 400*c*, which are labeled "Level Threshold" in these examples. The playback limit/level thresholds increase in the direction of the arrows on the vertical axes. The playback limit/level thresholds may, for example, be expressed in decibels. In these examples, the horizontal axes of the graphs 400*a*, 400*b* and 400*c* indicate frequencies, which increase in the direction of the arrows on the horizontal axes. The playback limit thresholds indicated by the curves 400*a*, 400*b* and 400*c* may, for example, be implemented by dynamics processing modules of individual loudspeakers.

The graph 400*a* of FIG. 4A shows a first example of playback limit threshold as a function of frequency. The curve 405*a* indicates the playback limit threshold for each corresponding frequency value. In this example, at a bass frequency $f_b$, input audio that is received at an input level $T_i$ will be output by a dynamics processing module at an output level $T_o$. The bass frequency fb may, for example, be in the range of 60 to 250 Hz. However, in this example, at a treble frequency $f_t$, input audio that is received at an input level $T_i$ will be output by a dynamics processing module at the same level, input level $T_i$. The treble frequency $f_t$ may, for example, be in the range above 1280 Hz. Accordingly, in this example the curve 405*a* corresponds to a dynamics processing module that applies a significantly lower threshold for bass frequencies than for treble frequencies. Such a dynamics processing module may be appropriate for a loudspeaker that has no woofer (e.g., the loudspeaker 205*d* of FIG. 2).

The graph 400*b* of FIG. 4B shows a second example of playback limit threshold as a function of frequency. The curve 405*b* indicates that at the same bass frequency fb shown in FIG. 4A, input audio that is received at an input level $T_i$, will be output by a dynamics processing module at a higher output level $T_o$. Accordingly, in this example the curve 405*b* corresponds to a dynamics processing module that does not apply as low a threshold for bass frequencies than the curve 405*a*. Such a dynamics processing module may be appropriate for a loudspeaker that has at least a small woofer (e.g., the loudspeaker 205*b* of FIG. 2).

The graph 400*c* of FIG. 4C shows a second example of playback limit threshold as a function of frequency. The curve 405*c* (which is a straight line in this example) indicates that at the same bass frequency fb shown in FIG. 4A, input audio that is received at an input level $T_i$ will be output by a dynamics processing module at the same level. Accordingly, in this example the curve 405*c* corresponds to a dynamics processing module that may be appropriate for a loudspeaker that is capable of reproducing a wide range of frequencies, including bass frequencies. One will observe that, for the sake of simplicity, a dynamics processing module could approximate the curve 405*c* by implementing the curve 405*d*, which applies the same threshold for all frequencies indicated.

A spatial audio mix may be rendered for the plurality of speakers using a known rendering system such as Center of Mass Amplitude Panning (CMAP) or Flexible Virtualization (FV). From the constituent components of a spatial audio mix, the rendering system generates speaker feeds, one for each of the plurality of speakers. In some previous examples, the speaker feeds were then processed independently by each speaker's associated dynamics processing function with thresholds $T_i[f]$. Without the benefits of the present disclosure, this described rendering scenario may result in distracting shifts in the perceived spatial balance of the rendered spatial audio mix. For example, one of the M speakers, say on the right-hand side of the listening area, may be much less capable than the others (e.g., of rendering audio in the bass range) and therefore the thresholds $T_i[f]$ for that speaker may be significantly lower than those of the other speakers, at least in a particular frequency range. During playback, this speaker's dynamics processing module will be lowering the level of components of the spatial mix on the right-hand side significantly more than components on the left-hand side. Listeners are extremely sensitive to such dynamic shifts between the left/right balance of a spatial mix and may find the results very distracting.

To deal with this issue, in some examples the individual loudspeaker dynamics processing configuration data (e.g., the playback limit thresholds) of the individual speakers of a listening environment are combined to create listening environment dynamics processing configuration data for all loudspeakers of the listening environment. The listening environment dynamics processing configuration data may then be utilized to first perform dynamics processing in the context of the entire spatial audio mix prior to its rendering to speaker feeds. Because this first stage of dynamics processing has access to the entire spatial mix, as opposed to just one independent speaker feed, the processing may be performed in ways that do not impart distracting shifts to the perceived spatial balance of the mix. The individual loudspeaker dynamics processing configuration data (e.g., the playback limit thresholds) may be combined in a manner that eliminates or reduces the amount of dynamics processing that is performed by any of the individual speaker's independent dynamics processing functions.

In one example of determining the listening environment dynamics processing configuration data, the individual loudspeaker dynamics processing configuration data (e.g., the playback limit thresholds) for the individual speakers may be combined into a single set of listening environment dynamics processing configuration data (e.g., frequency-varying playback limit thresholds $\overline{T}[f]$) that are applied to all components of the spatial mix in the first stage of dynamics processing. According to some such examples, because the limiting is the same on all components, the spatial balance of the mix may be maintained. One way to combine the individual loudspeaker dynamics processing configuration data (e.g., the playback limit thresholds) is to take minimum across all speakers i:

$$\overline{T}[f]=\min_i(T_i[f]) \quad \text{Equation (1)}$$

Such a combination essentially eliminates the operation of each speaker's individual dynamics processing because the spatial mix is first limited below the threshold of the least capable speaker at every frequency. However, such a strategy may be overly aggressive. Many speakers may be playing back at a level lower than they are capable, and the combined playback level of all the speakers may be objectionably low. For example, if the thresholds in the bass range shown in FIG. 4A were applied to the loudspeaker corresponding to the thresholds for FIG. 4C, the playback level of the latter speaker would be unnecessarily low in the bass range. An alternative combination of determining the listening environment dynamics processing configuration data is to take the mean (average) of individual loudspeaker dynamics processing configuration data across all speakers of the listening environment. For example, in the context of playback limit thresholds, the mean may be determined as follows:

$$\overline{T}[f]=\text{mean}_i(T_i[f]) \quad \text{Equation (2)}$$

For this combination, overall playback level may increase in comparison to taking the minimum because the first stage of dynamics processing limits to a higher level, thereby allowing the more capable speakers to play back more loudly. For speakers whose individual limit thresholds fall below the mean, their independent dynamics processing functions may still limit their associated speaker feed if necessary. However, the first stage of dynamics processing will likely have reduced the requirements of this limiting since some initial limiting has been performed on the spatial mix.

According to some examples of determining the listening environment dynamics processing configuration data, one may create a tunable combination that interpolates between the minimum and the mean of the individual loudspeaker dynamics processing configuration data through a tuning parameter a. For example, in the context of playback limit thresholds, the interpolation may be determined as follows:

$$\overline{T}[f]=\alpha\,\text{mean}_i(T_i[f])+(1-\alpha)\min_i(T_i[f]) \quad \text{Equation (3)}$$

Other combinations of individual loudspeaker dynamics processing configuration data are possible, and the present disclosure is meant to cover all such combinations.

Figure 5A:
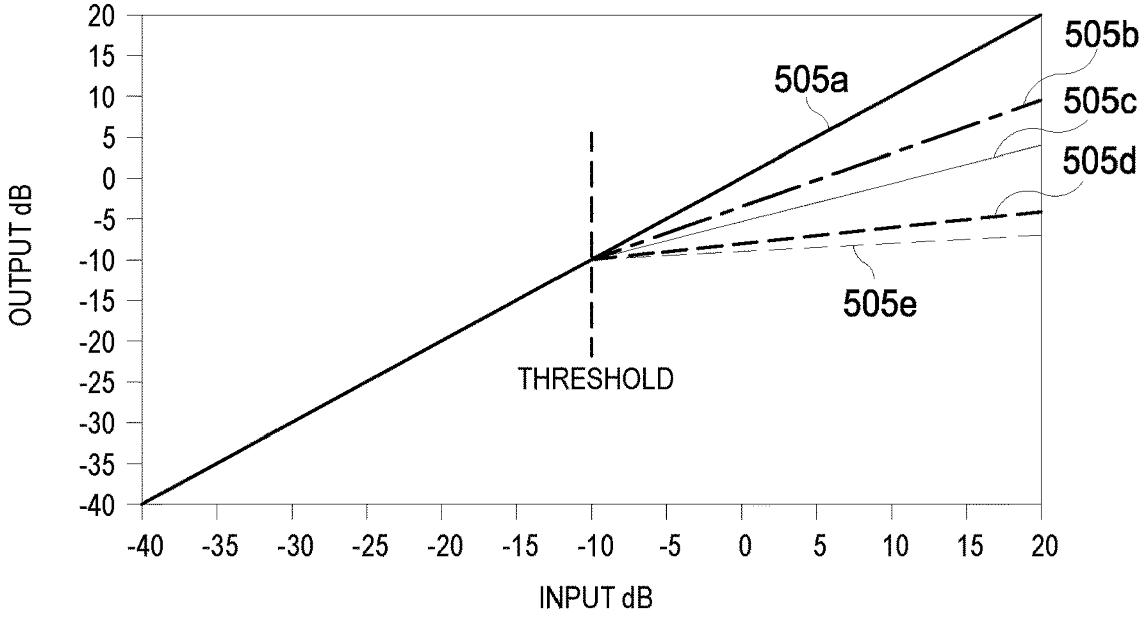
FIGS. 5A and 5B are graphs that show examples of dynamic range compression data.
Figure 5B:
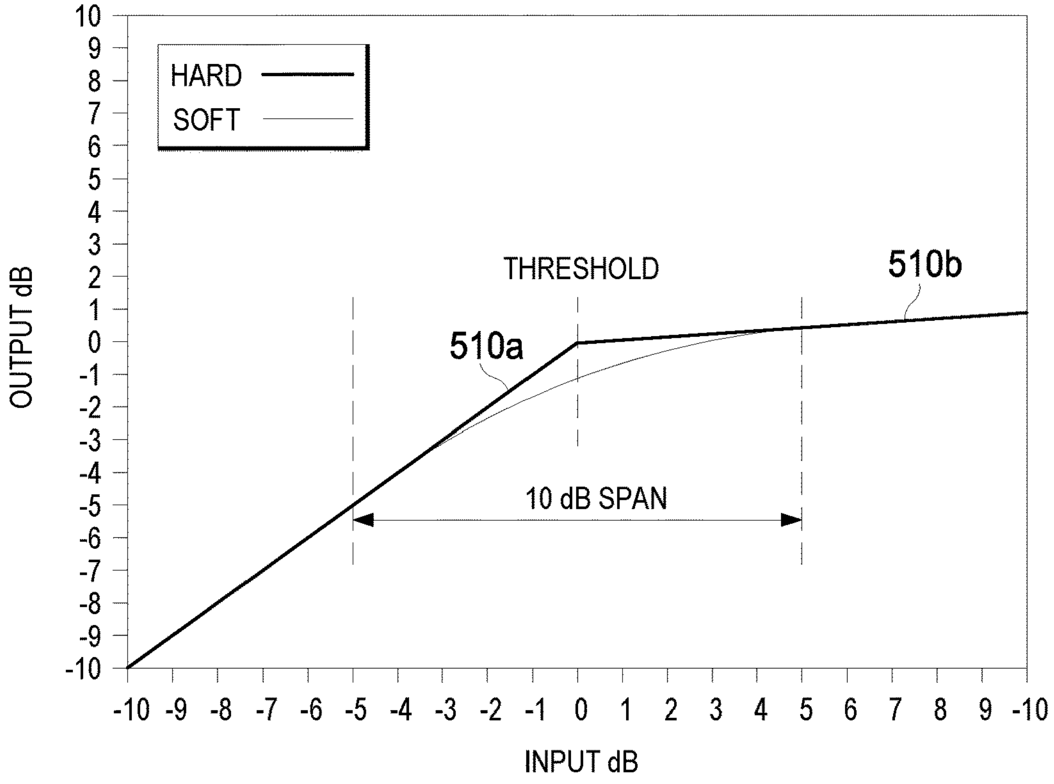

FIGS. 5A and 5B are graphs that show examples of dynamic range compression data. In graphs 500*a* and 500*b*, the input signal levels, in decibels, are shown on the horizontal axes and the output signal levels, in decibels, are shown on the vertical axes. As with other disclosed examples, the particular thresholds, ratios and other values are merely shown by way of example and are not limiting.

In the example shown in FIG. 5A, the output signal level is equal to the input signal level below the threshold, which is −10 dB in this example. Other examples may involve different thresholds, e.g., −20 dB, −18 dB, −16 dB, −14 dB, −12 dB, −8 dB, −6 dB, −4 dB, −2 dB, 0 dB, 2 dB, 4 dB, 6 dB, etc. Above the threshold, various examples of compression ratios are shown. An N:1 ratio means that above the threshold, the output signal level will increase by 1 dB for every N dB increase in the input signal. For example, a 10:1 compression ratio (line 505*e*) means that above the threshold, the output signal level will increase by only 1 dB for every 10 dB increase in the input signal. A 1:1 compression ratio (line 505*a*) means that the output signal level is still equal to the input signal level, even above the threshold. Lines 505*b*, 505*c*, and 505*d* correspond to 3:2, 2:1 and 5:1 compression ratios. Other implementations may provide different compression ratios, such as 2.5:1, 3:1, 3.5:1, 4:3, 4:1, etc.

FIG. 5B shows examples of "knees," which control how the compression ratio changes at or near the threshold, which is 0 dB in this example. According to this example, the compression curve having a "hard" knee is composed of two straight line segments, line segment 510*a* up to the threshold and line segment 510*b* above the threshold. A hard knee can be simpler to implement, but may cause artifacts.

In FIG. 5B, one example of a "soft" knee is also shown. In this example, the soft knee spans 10 dB. According to this implementation, above and below the 10 dB span, the compression ratios of the compression curve having the soft knee are the same as those of the compression curve having the hard knee. Other implementations may provide various other shapes of "soft" knees, which may span more or fewer decibels, may indicate a different compression ratio above the span, etc.

Other types of dynamic range compression data may include "attack" data and "release" data. The attack is a period during which the compressor is decreasing gain, e.g., in response to increased level at the input, to reach the gain determined by the compression ratio. Attack times for compressors generally range between 25 milliseconds and 500 milliseconds, though other attack times are feasible. The release is a period during which the compressor is increasing gain, e.g., in response to reduced level at the input, to reach the output gain determined by the compression ratio (or to the input level if the input level has fallen below the threshold). A release time may, for example, be in the range of 25 milliseconds to 2 seconds.

Accordingly, in some examples the individual loudspeaker dynamics processing configuration data may include, for each loudspeaker of the plurality of loudspeakers, a dynamic range compression data set. The dynamic range compression data set may include threshold data, input/output ratio data, attack data, release data and/or knee data. One or more of these types of individual loudspeaker dynamics processing configuration data may be combined to determine the listening environment dynamics processing configuration data. As noted above with reference to combining playback limit thresholds, the dynamic range compression data may be averaged to determine the listening environment dynamics processing configuration data in some examples. In some instances, a minimum or maximum value of the dynamic range compression data may be used to determine the listening environment dynamics processing configuration data (e.g., the maximum compression ratio). In other implementations, one may create a tunable combination that interpolates between the minimum and the mean of the dynamic range compression data for individual loudspeaker dynamics processing, e.g., via a tuning parameter such as described above with reference to Equation (3).

In some examples described above, a single set of listening environment dynamics processing configuration data (e.g., a single set of combined thresholds $\overline{T}[f]$) is applied to all components of the spatial mix in the first stage of dynamics processing. Such implementations can maintain the spatial balance of the mix, but may impart other unwanted artifacts. For example, "spatial ducking" may occur when a very loud part of the spatial mix in an isolated spatial region causes the entire mix to be turned down. Other softer components of the mix spatially distant form this loud component may be perceived to become unnaturally soft. For example, soft background music may be playing in the surround field of the spatial mix at a level lower than the combined thresholds $\overline{T}[f]$, and therefore no limiting of the spatial mix is performed by the first stage of dynamics processing. A loud gunshot might then be momentarily introduced at the front of the spatial mix (e.g. on screen for a movie sound track), and the overall level of the mix increases above the combined thresholds. At this moment, the first stage of dynamics processing lowers the level of the entire mix below the thresholds $\overline{T}[f]$. Because the music is spatially separate from the gunshot, this may be perceived as an unnatural ducking in the continuous stream of music.

To deal with such issues, some implementations allow independent or partially independent dynamics processing on different "spatial zones" of the spatial mix. A spatial zone may be considered a subset of the spatial region over which the entire spatial mix is rendered. Although much of the following discussion provides examples of dynamics processing based on playback limit thresholds, the concepts apply equally to other types of individual loudspeaker dynamics processing configuration data and listening environment dynamics processing configuration data.

Figure 6:
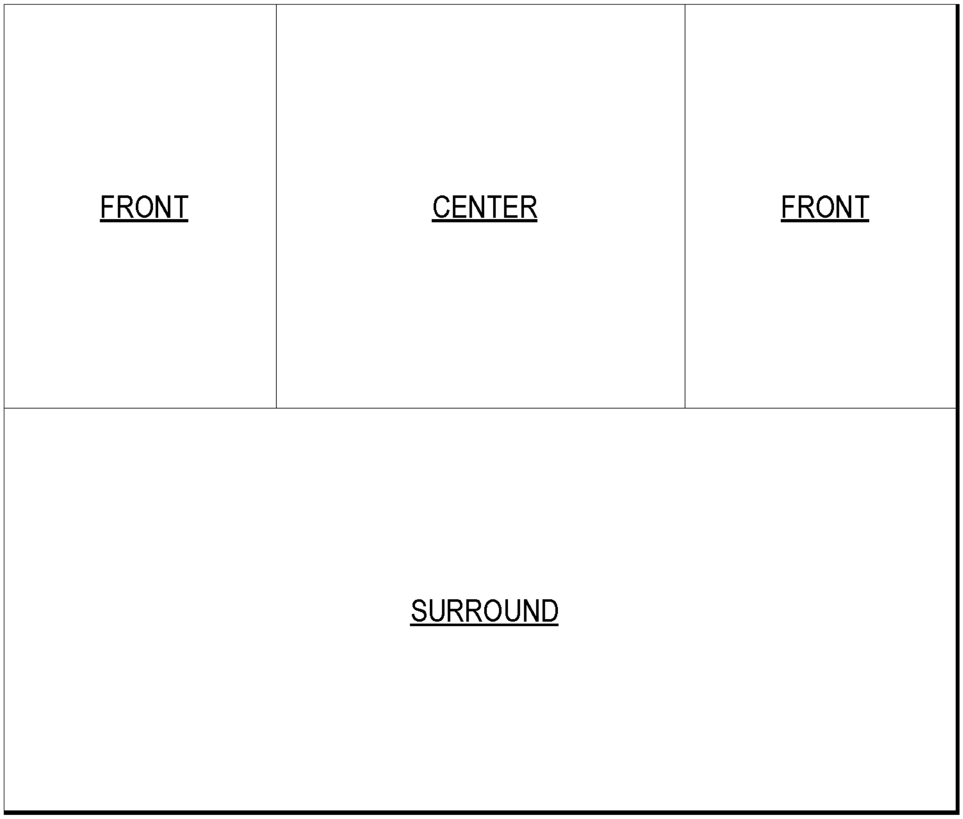
FIG. 6 shows an example of spatial zones of a listening environment.

FIG. 6 shows an example of spatial zones of a listening environment. FIG. 6 depicts an example of the region of the spatial mix (represented by the entire square), subdivided into three spatial zones: Front, Center, and Surround.

While the spatial zones in FIG. 6 are depicted with hard boundaries, in practice it is beneficial to treat the transition from one spatial zone to another as continuous. For example, a component of a spatial mix located at the middle of the left edge of the square may have half of its level assigned to the front zone and half to the surround zone. Signal level from each component of the spatial mix may be assigned and accumulated into each of the spatial zones in this continuous manner A dynamics processing function may then operate independently for each spatial zone on the overall signal level assigned to it from the mix. For each component of the spatial mix, the results of the dynamics processing from each spatial zone (e.g. time-varying gains per frequency) may then be combined and applied to the component. In some examples, this combination of spatial zone results is different for each component and is a function of that particular component's assignment to each zone. The end result is that components of the spatial mix with similar spatial zone assignments receive similar dynamics processing, but independence between spatial zones is allowed. The spatial zones may advantageously be chosen to prevent objectionable spatial shifts, such as left/right imbalance, while still allowing some spatially independent processing (e.g., to reduce other artifacts such as the described spatial ducking).

Techniques for processing a spatial mix by spatial zones may be advantageously employed in the first stage of dynamics processing of the present disclosure. For example, a different combination of individual loudspeaker dynamics processing configuration data (e.g., playback limit thresholds) across the speakers i may be computed for each spatial zone. The set of combined zone thresholds may be represented by $\overline{T}_j[f]$, where the index j refers to one of a plurality of spatial zones. A dynamics processing module may operate independently on each spatial zone with its associated thresholds $\overline{T}_j[f]$ and the results may be applied back onto the constituent components of the spatial mix according to the technique described above.

Consider the spatial signal being rendered as composed of a total of K individual constituent signals $x_k[t]$, each with an associated desired spatial position (possibly time-varying). One particular method for implementing the zone processing involves computing time-varying panning gains $\alpha_{kj}[t]$ describing how much each audio signal $x_k[t]$ contributes to zone j as a function the audio signal's desired spatial position in relation to the position of the zone. These panning gains may advantageously be designed to follow a power preserving panning law requiring that the sum of the squares of the gains equal unity. From these panning gains, zone signals $s_j[t]$ may be computed as the sum of the constituent signals weighted by their panning gain for that zone:

$$s_j[t]=\sum_{k=1}^{K}\alpha_{kj}[t]x_k[t] \quad \text{Equation (4)}$$

Each zone signal $s_j[t]$ may then be processed independently by a dynamics processing function DP parametrized by the zone thresholds $\overline{T}_j[f]$ to produce frequency and time varying zone modification gains $G_j$:

$$G_j[f,t]=DP\{s_j[t],\overline{T}_j[f]\} \quad \text{Equation (5)}$$

Frequency and time varying modification gains may then be computed for each individual constituent signal $x_k[t]$ by combining the zone modification gains in proportion to that signal's panning gains for the zones:

$$G_k[f,t]=\sqrt{\sum_{j=1}^{J}(\alpha_{kj}G_j[\overrightarrow{f,t}])^2} \quad \text{Equation (7)}$$

These signal modification gains $G_k$ may then be applied to each constituent signal, by use of a filterbank for example, to produce dynamics processed constituent signals $\hat{x}_k[t]$ which may then be subsequently rendered to speaker signals.

The combination of individual loudspeaker dynamics processing configuration data (such as speaker playback limit thresholds) for each spatial zone may be performed in a variety of manners. As one example, the spatial zone playback limit thresholds $\overline{T}_j[f]$ may be computed as a weighted sum of the speaker playback limit thresholds $T_i[f]$ using a spatial zone and speaker dependent weighting $w_{ij}[f]$:

$$\overline{T}_i[f]=\sum_i w_{ij}[f]T_i[f] \quad \text{Equation (8)}$$

Similar weighting functions may apply to other types of individual loudspeaker dynamics processing configuration data. Advantageously, the combined individual loudspeaker dynamics processing configuration data (e.g., playback limit thresholds) of a spatial zone may be biased towards the individual loudspeaker dynamics processing configuration data (e.g., the playback limit thresholds) of the speakers most responsible for playing back components of the spatial mix associated with that spatial zone. This may be achieved by setting the weights $w_{ij}[f]$ as a function of each speaker's responsibility for rendering components of the spatial mix associated with that zone for the frequency $f$.

Figure 7:
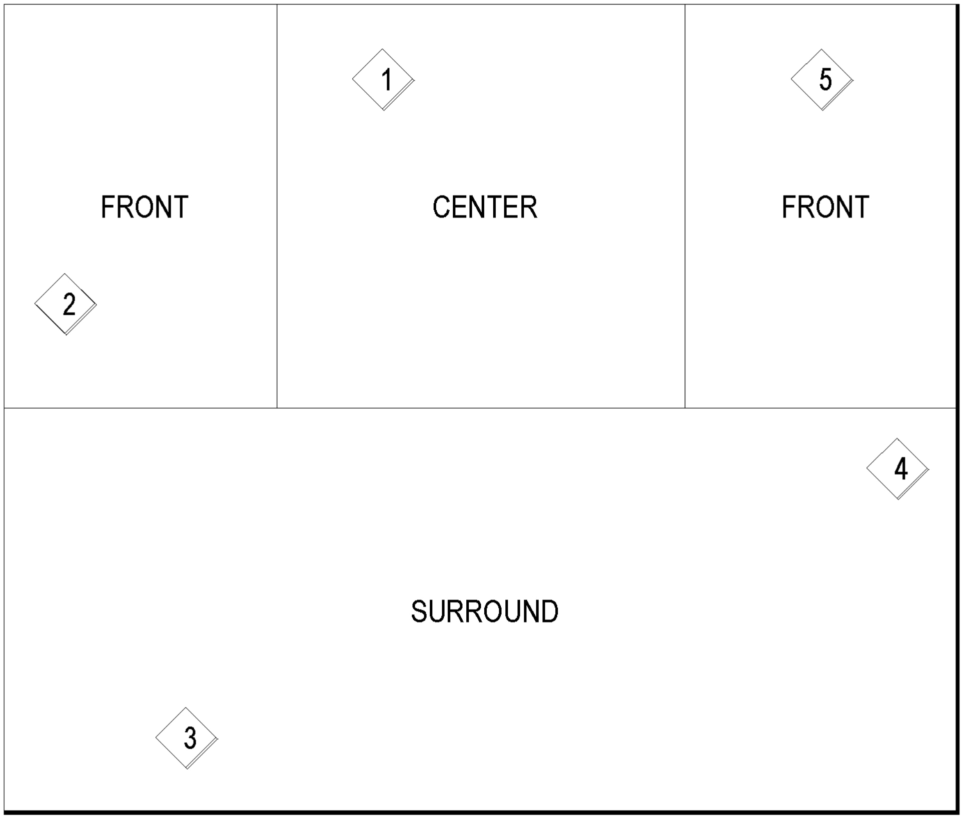
FIG. 7 shows examples of loudspeakers within the spatial zones of FIG. 6.

FIG. 7 shows examples of loudspeakers within the spatial zones of FIG. 6. FIG. 7 depicts the same zones from FIG. 6, but with the locations of five example loudspeakers (speakers 1, 2, 3, 4, and 5) responsible for rendering the spatial mix overlaid. In this example, the loudspeakers 1, 2, 3, 4, and 5 are represented by diamonds. In this particular example, speaker 1 is largely responsible for rendering the center zone, speakers 2 and 5 for the front zone, and speakers 3 and 4 for the surround zone. One could create weights with $w_{ij}[f]$ based on this notional one-to-one mapping of speakers to spatial zones, but as with the spatial zone based processing of the spatial mix, a more continuous mapping may be preferred. For example, speaker 4 is quite close to the front zone, and a component of the audio mix located between speakers 4 and 5 (though in the notional front zone) will likely be played back largely by a combination of speakers 4 and 5. As such, it makes sense for the individual loudspeaker dynamics processing configuration data (e.g., playback limit thresholds) of speaker 4 to contribute to the combined individual loudspeaker dynamics processing configuration data (e.g., playback limit thresholds) of the front zone as well as the surround zone.

One way to achieve this continuous mapping is to set the weights $w_{ij}[f]$ equal to a speaker participation value describing the relative contribution of each speaker i in rendering components associated with spatial zone j. Such values may be derived directly from the rendering system responsible for rendering to the speakers (e.g., from step (c) described above) and a set of one or more nominal spatial positions associated with each spatial zone. This set of nominal spatial positions may include a set of positions within each spatial zone.

Figure 8:
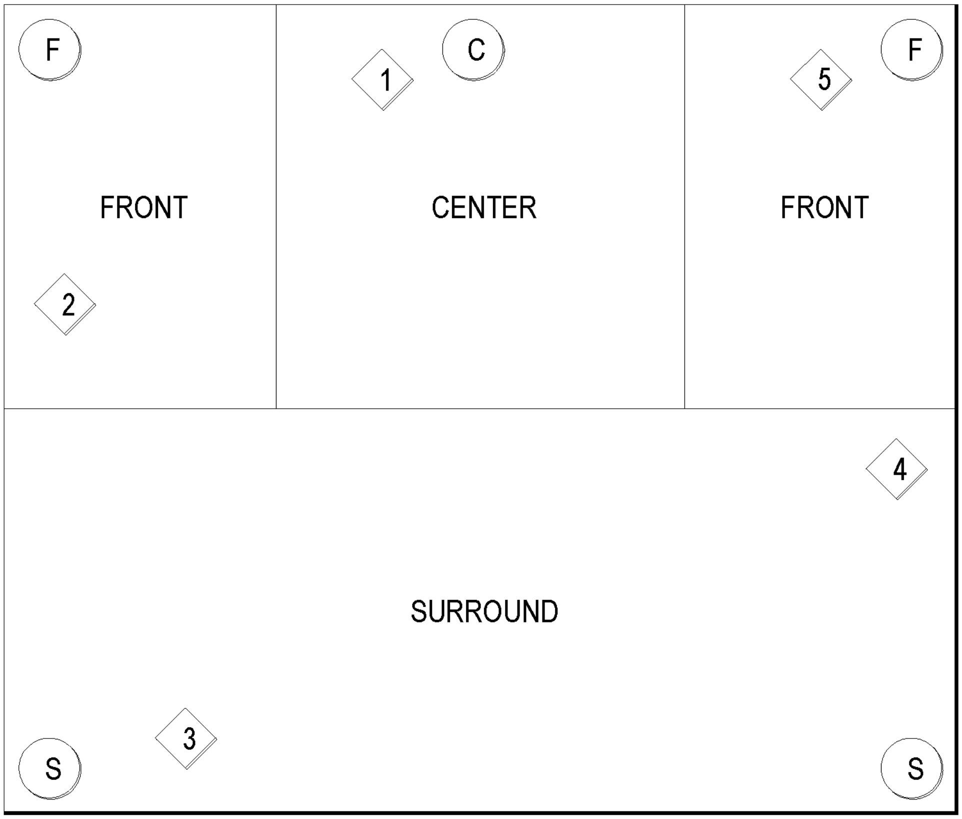
FIG. 8 shows an example of nominal spatial positions overlaid on the spatial zones and speakers of FIG. 7.

FIG. 8 shows an example of nominal spatial positions overlaid on the spatial zones and speakers of FIG. 7. The nominal positions are indicated by the numbered circles: associated with the front zone are two positions located at the top corners of the square, associated with the center zone is a single position at the top middle of the square, and associated with the surround zone are two positions at the bottom corners of the square.

To compute a speaker participation value for a spatial zone, each of the nominal positions associated with the zone may be rendered through the renderer to generate speaker activations associated with that position. These activations may, for example, be a gain for each speaker in the case of CMAP or a complex value at a given frequency for each speaker in the case of FV. Next, for each speaker and zone, these activations may be accumulated across each of the nominal positions associated with the spatial zone to produce a value $g_{ij}[f]$. This value represents the total activation of speaker i for rendering the entire set of nominal positions associated with spatial zone j. Finally, the speaker participation value in a spatial zone may be computed as the accumulated activation $g_{ij}[f]$ normalized by the sum of all these accumulated activations across speakers. The weights may then be set to this speaker participation value:

$$w_{ij}[f]=\frac{g_{ij}[f]}{\sum_i g_{ij}[f]} \quad \text{Equation (9)}$$

The described normalization ensures that the sum of $w_{ij}[f]$ across all speakers i is equal to one, which is a desirable property for the weights in Equation 8.

According to some implementations, the process described above for computing speaker participation values and combining thresholds as a function of these values may be performed as a static process where the resulting combined thresholds are computed once during a setup procedure that determines the layout and capabilities of the speakers in the environment. In such a system it may be assumed that once set up, both the dynamics processing configuration data of the individual loudspeakers and the manner in which the rendering algorithm activates loudspeakers as a function of desired audio signal location remains static. In certain systems, however, both these aspects may vary over time, in response to changing conditions in the playback environment for example, and as such it may be desirable to update the combined thresholds according to the process described above in either a continuous or event-triggered fashion to take into account such variations.

Both the CMAP and FV rendering algorithms may be augmented to adapt to one or more dynamically configurable functions responsive to changes in the listening environment. For example, with respect to FIG. 7, a person located near speaker 3 may utter the wakeword of a smart assistant associated with the speakers, thereby placing the system in a state where it is ready to listen to a subsequent command from the person. While the wakeword is uttered the system may determine the location of the person using the microphones associated with the loudspeakers. With this information, the system may then choose to divert energy of the audio being played back from speaker 3 into other speakers so that the microphones on speaker 3 may better hear the person. In such a scenario, speaker 2 in FIG. 7 may for a period of time essentially "take over" the responsibilities of speaker 3, and as a result the speaker participation values for the surround zone change significantly; the participation value of speaker 3 decreases and that of speaker 2 increases. The zone thresholds may then be recomputed since they depend on the speaker participation values which have changed. Alternatively, or in addition to these changes to the rendering algorithm, the limit thresholds of speaker 3 may be lowered below their nominal values set to prevent the speaker from distorting. This may ensure that any remaining audio playing from speaker 3 does not increase beyond some threshold determined to cause interference with the microphones listening to the person. Since the zone thresholds are also a function of the individual speaker thresholds, they may be updated in this case as well.

Figure 9:
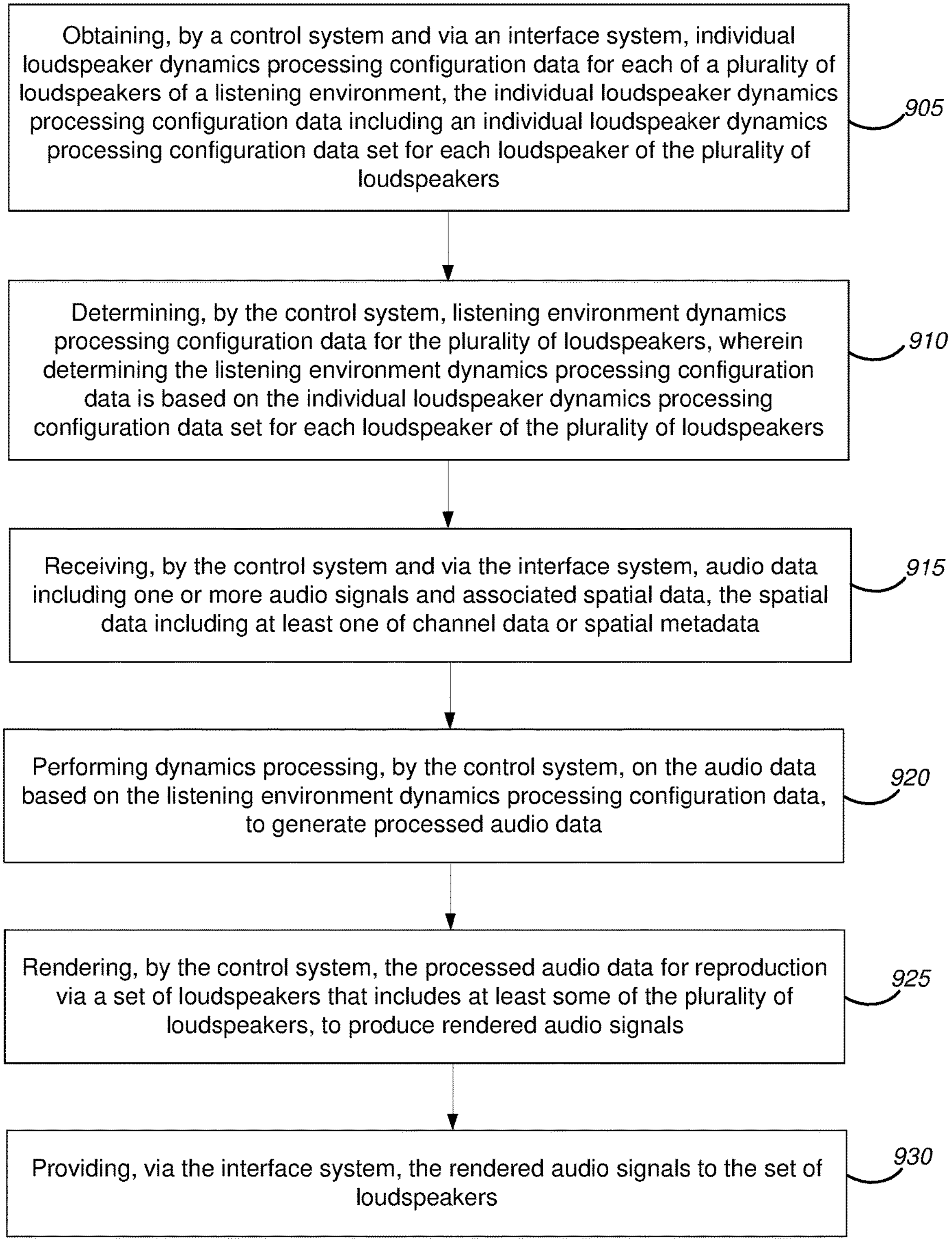
FIG. 9 is a flow diagram that outlines one example of a method that may be performed by an apparatus or system such as those disclosed herein.

FIG. 9 is a flow diagram that outlines one example of a method that may be performed by an apparatus or system such as those disclosed herein. The blocks of method 900, like other methods described herein, are not necessarily performed in the order indicated. In some implementation, one or more of the blocks of method 900 may be performed concurrently. Moreover, some implementations of method 900 may include more or fewer blocks than shown and/or described. The blocks of method 900 may be performed by one or more devices, which may be (or may include) a control system such as the control system 110 that is shown in FIG. 1 and described above, or one of the other disclosed control system examples.

According to this example, block 905 involves obtaining, by a control system and via an interface system, individual loudspeaker dynamics processing configuration data for each of a plurality of loudspeakers of a listening environment. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data.

In some instances, block 905 may involve obtaining the individual loudspeaker dynamics processing configuration data sets from each of the plurality of loudspeakers of a listening environment. In other examples, block 905 may involve obtaining the individual loudspeaker dynamics processing configuration data sets from a data structure stored in a memory. For example, the individual loudspeaker dynamics processing configuration data sets may have previously been obtained, e.g., as part of a set-up procedure for each of the loudspeakers, and stored in the data structure.

According to some examples, the individual loudspeaker dynamics processing configuration data sets may be proprietary. In some such examples, the individual loudspeaker dynamics processing configuration data may sets have previously been estimated, based on the individual loudspeaker dynamics processing configuration data for speakers having similar characteristics. For example, block 905 may involve a speaker matching process of determining the most similar speaker from a data structure indicating a plurality of speakers and a corresponding individual loudspeaker dynamics processing configuration data set for each of the plurality of speakers. The speaker matching process may be based, e.g., on a comparison of the size of one or more woofers, tweeters and/or midrange speakers.

In this example, block 910 involves determining, by the control system, listening environment dynamics processing configuration data for the plurality of loudspeakers. According to this implementation, determining the listening environment dynamics processing configuration data is based on the individual loudspeaker dynamics processing configuration data set for each loudspeaker of the plurality of loudspeakers. Determining the listening environment dynamics processing configuration data may involve combining the individual loudspeaker dynamics processing configuration data of the dynamics processing configuration data set, e.g., by taking the average of one or more types of individual loudspeaker dynamics processing configuration data. In some instances, determining the listening environment dynamics processing configuration data may involve determining a minimum or a maximum value of one or more types of individual loudspeaker dynamics processing configuration data. According to some such implementations, determining the listening environment dynamics processing configuration data may involve interpolating between a minimum or a maximum value and a mean value of one or more types of individual loudspeaker dynamics processing configuration data.

In this implementation, block 915 involves receiving, by a control system and via an interface system, audio data including one or more audio signals and associated spatial data. For example, the spatial data may indicate an intended perceived spatial position corresponding to an audio signal. In this example, the spatial data includes channel data and/or spatial metadata.

In this example, block 920 involves performing dynamics processing, by the control system, on the audio data based on the listening environment dynamics processing configuration data, to generate processed audio data. The dynamics processing of block 920 may involve any of the disclosed dynamics processing methods disclosed herein, including but not limited to applying one or more playback limit thresholds, compression data, etc.

Here, block 925 involves rendering, by the control system, the processed audio data for reproduction via a set of loudspeakers that includes at least some of the plurality of loudspeakers, to produce rendered audio signals. In some examples, block 925 may involve applying a CMAP rendering process, an FV rendering process, or a combination of the two. In this example, block 920 is performed prior to block 925. However, as noted above, block 920 and/or block 910 may be based, at least in part, on the rendering process of block 925. Blocks 920 and 925 may involve performing processes such as those described above with reference to the listening environment dynamics processing module and the rendering module 320 of FIG. 3.

According to this example, block 930 involves providing, via the interface system, the rendered audio signals to the set of loudspeakers. In one example, block 930 may involves providing, by the smart home hub 305 and via its interface system, the rendered audio signals to the loudspeakers *205a* through *205m*.

In some examples, the method 900 may involve performing dynamics processing on the rendered audio signals according to the individual loudspeaker dynamics processing configuration data for each loudspeaker of the set of loudspeakers to which the rendered audio signals are provided. For example, referring again to FIG. 3, the dynamics processing modules A through M may perform dynamics processing on the rendered audio signals according to the individual loudspeaker dynamics processing configuration data for the loudspeakers 205*a* through 205*m*.

In some implementations, the individual loudspeaker dynamics processing configuration data may include a playback limit threshold data set for each loudspeaker of the plurality of loudspeakers. In some such examples, the playback limit threshold data set may include playback limit thresholds for each of a plurality of frequencies.

Determining the listening environment dynamics processing configuration data may, in some instances, involve determining minimum playback limit thresholds across the plurality of loudspeakers. In some examples, determining the listening environment dynamics processing configuration data may involve averaging the playback limit thresholds to obtain averaged playback limit thresholds across the plurality of loudspeakers. In some such examples, determining the listening environment dynamics processing configuration data may involve determining minimum playback limit thresholds across the plurality of loudspeakers and interpolating between the minimum playback limit thresholds and the averaged playback limit thresholds.

According to some implementations, averaging the playback limit thresholds may involve determining a weighted average of the playback limit thresholds. In some such examples, the weighted average may be based, at least in part, on characteristics of a rendering process implemented by the control system, e.g., characteristics of the rendering process of block 925.

In some implementations, performing dynamics processing on the audio data may be based on spatial zones. Each of the spatial zones may correspond to a subset of the listening environment.

According to some such implementations, the dynamics processing may be performed separately for each of the spatial zones. For example, determining the listening environment dynamics processing configuration data may be performed separately for each of the spatial zones. For example, combining the dynamics processing configuration data sets across the plurality of loudspeakers may be performed separately for each of the one or more spatial zones. In some examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

In some examples, combining the dynamics processing configuration data sets across the plurality of loudspeakers separately for each of the one or more spatial zones may be based, at least in part, on a loudspeaker participation value for each loudspeaker in each of the one or more spatial zones. Each loudspeaker participation value may be based, at least in part, on one or more nominal spatial positions within each of the one or more spatial zones. The nominal spatial positions may, in some examples, correspond to canonical locations of channels in a Dolby 5.1, Dolby 5.1.2, Dolby 7.1, Dolby 7.1.4 or Dolby 9.1 surround sound mix. In some such implementations, each loudspeaker participation value is based, at least in part, on an activation of each loudspeaker corresponding to rendering of audio data at each of the one or more nominal spatial positions within each of the one or more spatial zones.

According to some such examples, the weighted average of the playback limit thresholds may be based, at least in part, on activation of loudspeakers by the rendering process as a function of audio signal proximity to the spatial zones. In some instances, the weighted average may be based, at least in part, on a loudspeaker participation value for each loudspeaker in each of the spatial zones. In some such examples, each loudspeaker participation value may be based, at least in part, on one or more nominal spatial positions within each of the spatial zones. For example, the nominal spatial positions may correspond to canonical locations of channels in a Dolby 5.1, Dolby 5.1.2, Dolby 7.1, Dolby 7.1.4 or Dolby 9.1 surround sound mix. In some implementations, each loudspeaker participation value may be based, at least in part, on an activation of each loudspeaker corresponding to rendering of audio data at each of the one or more nominal spatial positions within each of the spatial zones.

According to some implementations, rendering the processed audio data may involve determining relative activation of the set of loudspeakers according to one or more dynamically configurable functions. Some examples are described below with reference to FIG. 10 et seq. The one or more dynamically configurable functions may be based on one or more properties of the audio signals, one or more properties of the set of loudspeakers, or one or more external inputs. For example, the one or more dynamically configurable functions may be based on proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance Relative activation of the speakers may, in some examples, be based on a cost function of a model of perceived spatial position of the audio signals when played back over the speakers, a measure of proximity of the intended perceived spatial position of the audio signals to positions of the speakers, and one or more of the dynamically configurable functions.

In some examples, minimization of the cost function (including at least one dynamic speaker activation term) may result in deactivation of at least one of the speakers (in the sense that each such speaker does not play the relevant audio content) and activation of at least one of the speakers (in the sense that each such speaker plays at least some of the rendered audio content). The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

According to some implementations, the individual loudspeaker dynamics processing configuration data may include, for each loudspeaker of the plurality of loudspeakers, a dynamic range compression data set. In some instances, the dynamic range compression data set may include one or more of threshold data, input/output ratio data, attack data, release data or knee data.

As noted above, in some implementations at least some blocks of method 900 that are shown in FIG. 9 may be omitted. For example, in some implementations blocks 905 and 910 are performed during a set-up process. After the listening environment dynamics processing configuration data are determined, in some implementations steps 905 and

910 are not performed again during "run time" operation unless the type and/or arrangement of speakers of the listening environment changes. For example, in some implementations there may be an initial check to determine whether any loudspeakers have been added or disconnected, whether any loudspeakers positions have changed, etc. If so, steps 905 and 910 may be implemented. If not, steps 905 and 910 may not be performed again prior to "runtime" operations, which may involve blocks 915-930.

As noted above, existing flexible rendering techniques include Center of Mass Amplitude Panning (CMAP) and Flexible Virtualization (FV). From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g)=C_{spatial}(g,\vec{o},\{\vec{s}_i\})+C_{proximity}(g,\vec{o},\{\vec{s}_i\}) \qquad \text{Equation (10)}$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt}=\min_g C(g,\vec{o},\{\vec{s}_i\}) \qquad \text{Equation (11a)}$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt}=\frac{g_{opt}}{\|g_{opt}\|} \qquad \text{Equation (11b)}$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o}=\frac{\sum_{i=1}^{M} g_i\vec{s}_i}{\sum_{i=1}^{M} g_i} \qquad \text{Equation (12)}$$

Equation 3 is then manipulated into a spatial cost representing the squared error between the desired audio position and that produced by the activated loudspeakers:

$$C_{psatial}(g,\vec{o},\{\vec{s}_i\})=\|(\Sigma_{t=1}^{M}g_i)\vec{o}-\Sigma_{i=1}^{M}g_i\vec{s}_i\|^2=\|\Sigma_{i=1}^{M}g_i(\vec{o}=\vec{s}_i)\|^2 \qquad \text{Equation (13)}$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b=HRTF\{\vec{o}\} \qquad \text{Equation (14)}$$

At the same time, the 2×1 binaural response e produced at the listener's ears by the loudspeakers is modelled as a 2×M acoustic transmission matrix H multiplied with the M×1 vector g of complex speaker activation values:

$$e=Hg \qquad \text{Equation (15)}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 14) and that produced by the loudspeakers (Equation 15):

$$C_{spatial}(g,\vec{o},\{\vec{s}_i\})=(b-Hg)^*(b-Hg) \qquad \text{Equation (16)}$$

Conveniently, the spatial term of the cost function for CMAP and FV defined in Equations 13 and 16 can both be rearranged into a matrix quadratic as a function of speaker activations g:

$$C_{spatial}(g,\vec{o},\{\vec{s}_i\})=g^*Ag+Bg+C \qquad \text{Equation (17)}$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g,\vec{o},\{\vec{s}_i\})=g^*Dg \qquad \text{Equation (18a)}$$

where D is a diagonal matrix of distance penalties between the desired audio position and each speaker:

$$D = \begin{bmatrix} d_1 & \cdots & 0 \\ \vdots & \ddots & \vdots \\ 0 & \cdots & d_M \end{bmatrix}, d_i = \text{distance}\left(\vec{o}, \vec{s}_i\right) \quad \text{Equation (18b)}$$

The distance penalty function can take on many forms, but the following is a useful parameterization $$\text{distance}\left(\vec{o}, \vec{s}_i\right) = \alpha d_0^2 \left(\frac{\left\|\vec{o} - \vec{s}_i\right\|}{d_0}\right)^{\beta} \quad \text{Equation (18c)}$$

where $\|\vec{o} - \vec{s}_i\|$ is the Euclidean distance between the desired audio position and speaker position and α and β are tunable parameters. The parameter a indicates the global strength of the penalty; $d_0$ corresponds to the spatial extent of the distance penalty (loudspeakers at a distance around $d_0$ or futher away will be penalized), and β accounts for the abruptness of the onset of the penalty at distance $d_0$.

Combining the two terms of the cost function defined in Equations 17 and 18a yields the overall cost function $$C(g)=g^*Ag+Bg+C+g^*Dg=g^*(A+D)g+Bg+C \quad \text{Equation (19)}$$

Setting the derivative of this cost function with respect to g equal to zero and solving for g yields the optimal speaker activation solution:

$$g_{opt=}½(A+D)^{-1}B \quad \text{Equation (20)}$$

In general, the optimal solution in Equation 20 may yield speaker activations that are negative in value. For the CMAP construction of the flexible renderer, such negative activations may not be desirable, and thus Equation (20) may be minimized subject to all activations remaining positive.

Figure 10:
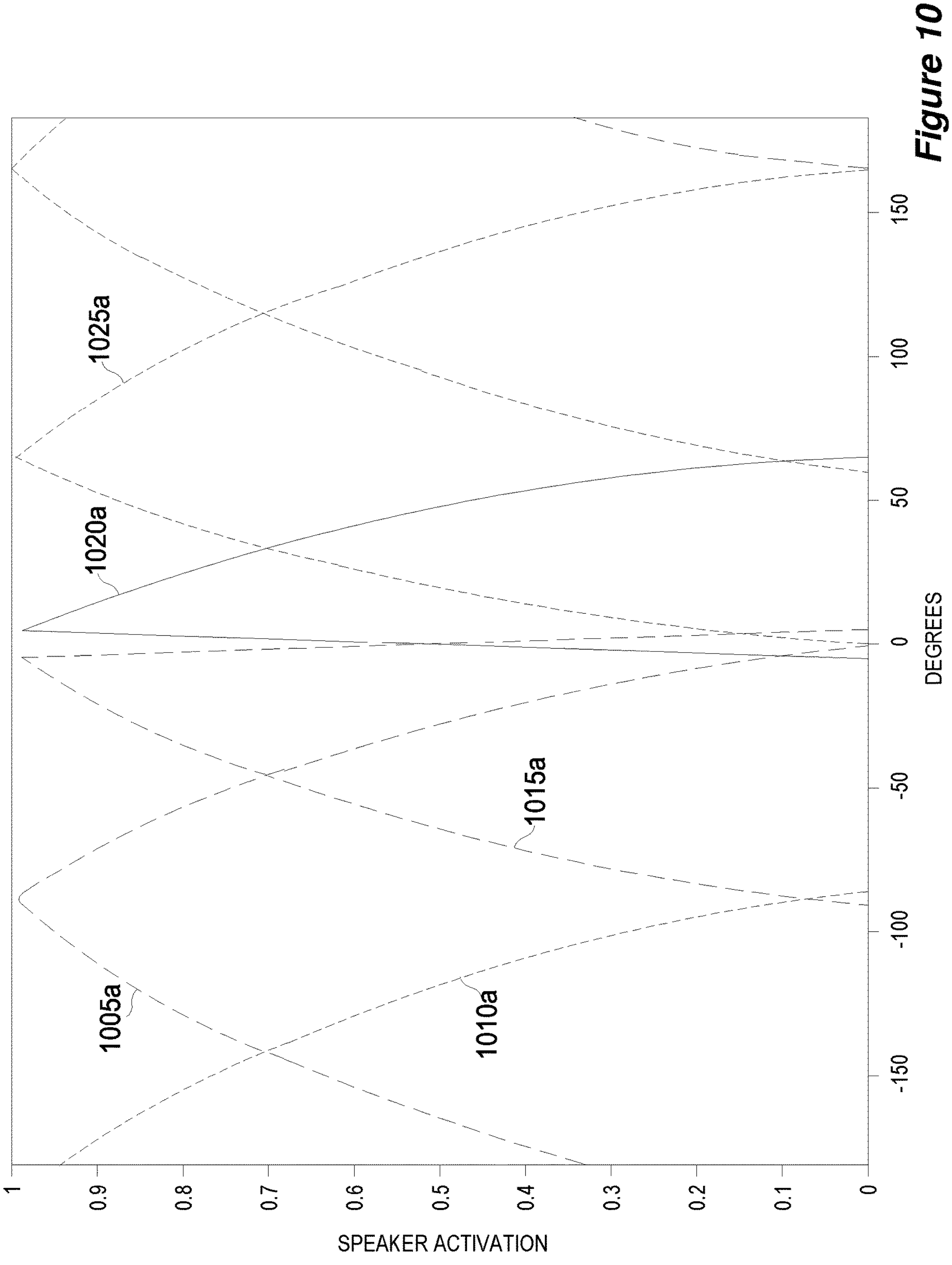
FIGS. 10 and 11 are diagrams that illustrate an example set of speaker activations and object rendering positions.
Figure 11:
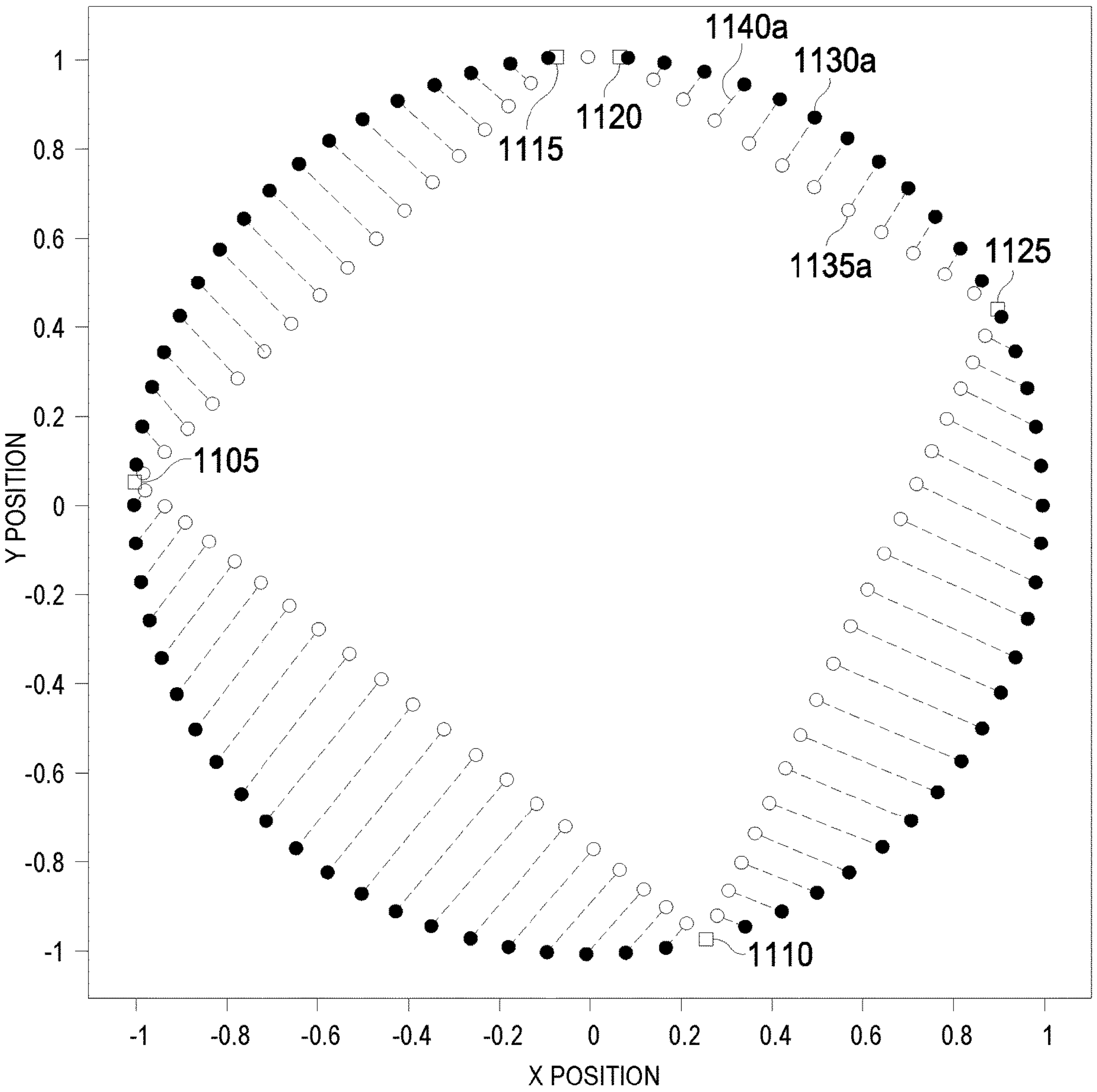

FIGS. 10 and 11 are diagrams that illustrate an example set of speaker activations and object rendering positions. In these examples, the speaker activations and object rendering positions correspond to speaker positions of 4, 64, 165, −87, and −4 degrees. In other implementations there may be more or fewer speakers and/or speakers in different positions. FIG. 10 shows the speaker activations 1005*a*, 1010*a*, 1015*a*, 1020*a* and 1025*a*, which comprise the optimal solution to Equation 20 for these particular speaker positions. FIG. 11 plots the individual speaker positions as squares 1105, 1110, 1115, 1120 and 1125, which correspond to speaker activations 1005*a*, 1010*a*, 1015*a*, 1020*a* and 1025*a*, respectively, of FIG. 10. In FIG. 11, angle 4 corresponds to speaker position 1120, angle 64 corresponds to speaker position 1125, angle 165 corresponds to speaker position 1110, angle −87 corresponds to speaker position 1105 and angle −4 corresponds to speaker position 1115. FIG. 11 also shows ideal object positions (in other words, positions at which audio objects are to be rendered) for a multitude of possible object angles as dots 1130*a* and the corresponding actual rendering positions for those objects as dots 1135*a*, connected to the ideal object positions by dotted lines 1140*a*.

Figure 12A:
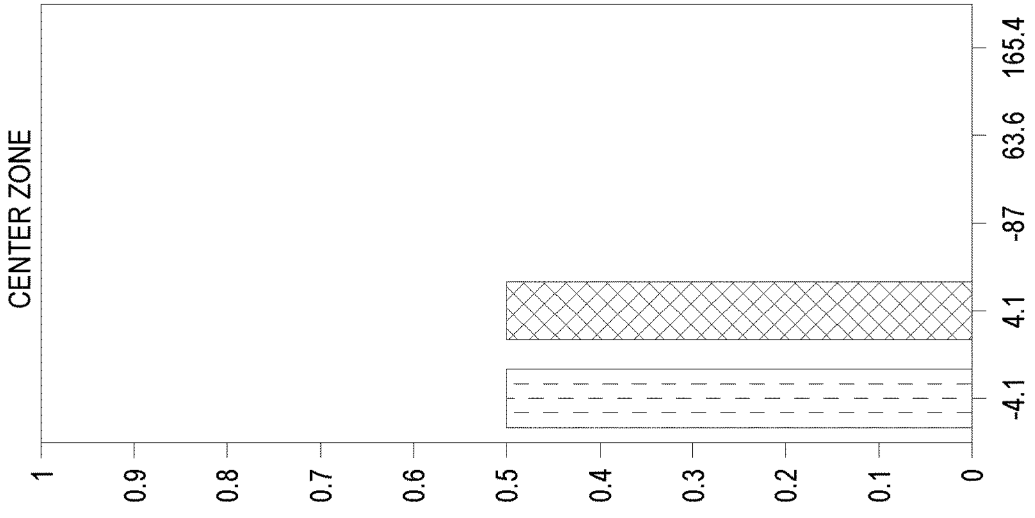
FIGS. 12A, 12B and 12C show examples of loudspeaker participation values corresponding to the examples of FIGS. 10 and 11.
Figure 12B:
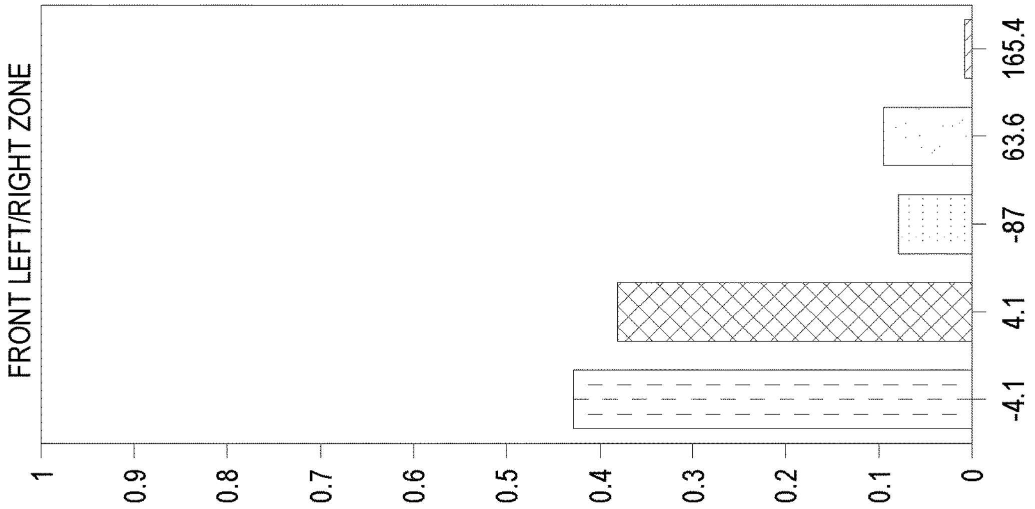
Figure 12C:
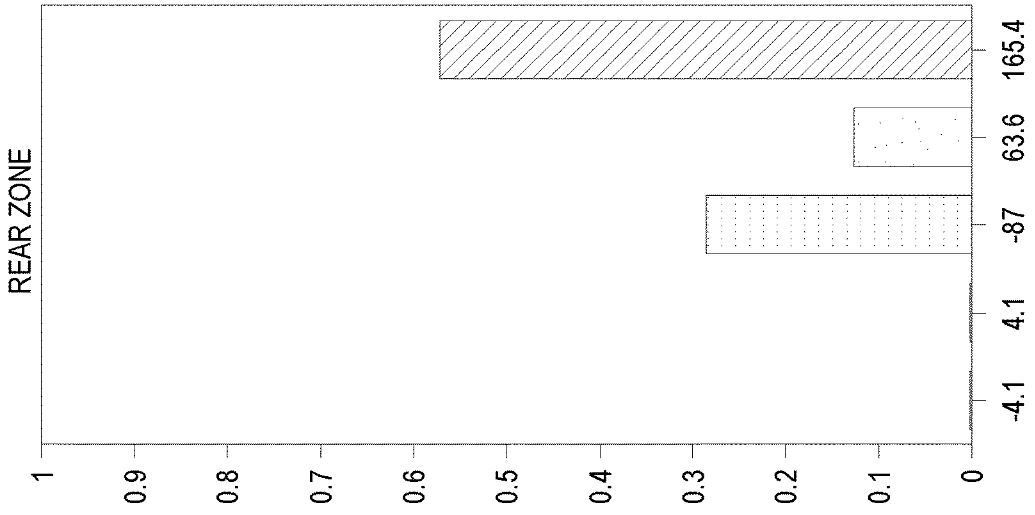

FIGS. 12A, 12B and 12C show examples of loudspeaker participation values corresponding to the examples of FIGS. 10 and 11. In FIGS. 12A, 12B and 12C, angle −4.1 corresponds to speaker position 1115 of FIG. 11, angle 4.1 corresponds to speaker position 1120 of FIG. 11, angle −87 corresponds to speaker position 1105 of FIG. 11, angle 63.6 corresponds to speaker position 1125 of FIG. 11 and angle 165.4 corresponds to speaker position 1110 of FIG. 11. These loudspeaker participation values are examples of the "weightings" relating to spatial zones that are disclosed elsewhere herein. According to these examples, the loudspeaker participation values shown in FIGS. 12A, 12B and 12C correspond to each loudspeaker's participation in each of the spatial zones shown in FIG. 6: the loudspeaker participation values shown in FIG. 12A correspond to each loudspeaker's participation in the center zone, the loudspeaker participation values shown in FIG. 12B correspond to each loudspeaker's participation in the front left and right zones, and the loudspeaker participation values shown in FIG. 12C correspond to each loudspeaker's participation in the rear zone.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g)=C_{spatial}(g,\vec{o},\{\vec{s}_i\})+C_{proximity}(g,\vec{i},\{\vec{s}_i\})+\Sigma_j C_j\{\{\hat{o}\},\{\{\hat{S}_i\},\{\hat{e}\}\because_j) \quad \text{Equation (21)}$$

In Equation 21, the terms $C_j(g, \{\{\hat{o}\}, \{\hat{s}_i\}, \{\hat{e}\}\}_j)$ represent additional cost terms, with {ô} representing a set of one or more properties of the audio signals (e.g., of an object-based audio program) being rendered, $\{\hat{s}_i\}$ representing a set of one or more properties of the speakers over which the audio is being rendered, and {ê} representing one or more additional external inputs. Each term $C_j(g\ \{\{\hat{o}\}, \{\hat{s}_i\}, \{\hat{e}\}\}_j)$ returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$ contains at a minimum only one element from any of {ô}, $\{\hat{s}_i\}$, or {ê}.

Examples of {ô} include but are not limited to:

Desired perceived spatial position of the audio signal;

Level (possible time-varying) of the audio signal; and/or

Spectrum (possibly time-varying) of the audio signal.

Examples of $\{\hat{s}_i\}$ include but are not limited to:

Locations of the loudspeakers in the listening space;

Frequency response of the loudspeakers;

Playback level limits of the loudspeakers;

Parameters of dynamics processing algorithms within the speakers, such as limiter gains;

A measurement or estimate of acoustic transmission from each speaker to the others;

A measure of echo canceller performance on the speakers; and/or

Relative synchronization of the speakers with respect to each other.

Examples of {ê} include but are not limited to:

Locations of one or more listeners or talkers in the playback space;

- A measurement or estimate of acoustic transmission from each loudspeaker to the listening location;
- A measurement or estimate of the acoustic transmission from a talker to the set of loudspeakers;
- Location of some other landmark in the playback space; and/or
- A measurement or estimate of acoustic transmission from each speaker to some other landmark in the playback space;

With the new cost function defined in Equation 21, an optimal set of activations may be found through minimization with respect to g and possible post-normalization as previously specified in Equations 11a and 11b.

Similar to the proximity cost defined in Equations 18a and 18b, it is also convenient to express each of the new cost function terms $C_j(g, \{\{\hat{o}\}, \{\hat{s}_i\}, \{\hat{e}\cdot.\cdot\}_j)$ as a weighted sum of the absolute values squared of speaker activations:

$$C_j(g,\{\{\hat{o}\},\{\hat{s}_i\},\{\hat{e}\}\}_j)=g^*W_j(\{\{\hat{o}\},\{\hat{s}_i,\{\hat{e}\}\}_j)_g \qquad \text{Equation(22a)}$$

where $W_j$ is a diagonal matrix of weights $w_{ij}=w_{ij}(\{\{\hat{o}\}, \{\hat{s}_i, \{\hat{e}\}\}_j)$ describing the cost associated with activating speaker i for the term j:

$$W_j = \begin{bmatrix} w_{1j} & \dots & 0 \\ \vdots & \ddots & \vdots \\ 0 & \dots & w_{Mj} \end{bmatrix} \qquad \text{Equation (22b)}$$

Combining Equations 22a and 22b with the matrix quadratic version of the CMAP and FV cost functions given in Equation 19 yields a potentially beneficial implementation of the general expanded cost function (of some embodiments) given in Equation 21:

$$C(g)=g^*AG+Bg+C+g^*Dg+\Sigma_j g^*W_j g=g^*(A+D+\Sigma_j W_j)g+Bg+B \qquad \text{Equation (23)}$$

With this definition of the new cost function terms, the overall cost function remains a matrix quadratic, and the optimal set of activations $g_{opt}$ can be found through differentiation of Equation 23 to yield $$g_{opt}=\tfrac{1}{2}(A+D+\Sigma_j W_j)^{-1}B \qquad \text{Equation (24)}$$

It is useful to consider each one of the weight terms $w_{ij}$ as functions of a given continuous penalty value $p_{ij}=p_{ij}(\{\hat{o}\}, \{\hat{s}_i, \{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \qquad \text{Equation (25)}$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \qquad \text{Equation (26)}$$

where $\alpha_j$, $\beta_j$, $\tau_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \rightarrow w'_{ij}=w_{ij}=\min_i(i\ w_{ij}) \qquad \text{Equation (27)}$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight $w_{ij}$ takes the form of Equation 26 with the continuous penalty value $p_{ij}$ given by the distance of the ith speaker from a fixed attractor location $\vec{l}_j$ and the threshold value $\tau_j$ given by the maximum of these distances across all speakers:

$$p_{ij}=\|\vec{l}_j-\vec{s}_i\| \qquad \text{and Equation (28a)}$$

$$\tau_j=\max_i\|\vec{l}_j-\vec{s}_i\| \qquad \text{Equation (28b)}$$

To illustrate the use case of "pulling" audio towards a listener or talker, we specifically set $\alpha_j=20$, $\beta_j=3$, and $\vec{l}_j$ to a vector corresponding to a listener/talker position of 180 degrees (bottom, center of the plot). These values of $\alpha_j$, $\beta_j$, and $\vec{l}_j$ are merely examples. In some implementations, $\alpha_j$ may be in the range of 1 to 100 and $\beta_j$ may be in the range of 1 to 25.

Figure 13:
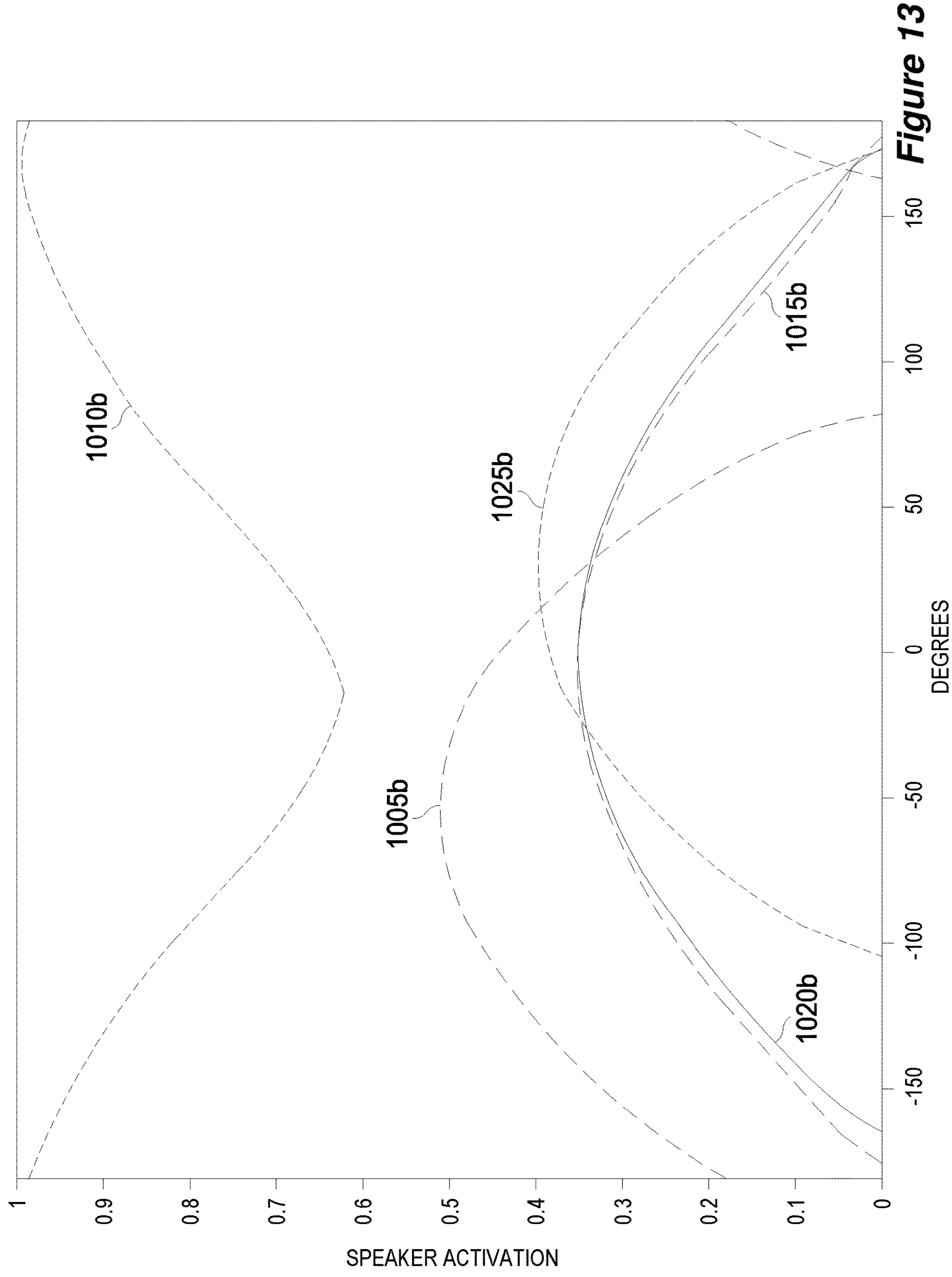
FIG. 13 is a graph of speaker activations in an example embodiment.

FIG. 13 is a graph of speaker activations in an example embodiment. In this example, FIG. 13 shows the speaker activations 1005*b*, 1010*b*, 1015*b*, 1020*b* and 1025*b*, which comprise the optimal solution to the cost function for the same speaker positions from FIGS. 10 and 11 with the addition of the attracting force represented by $w_{ij}$.

Figure 14:
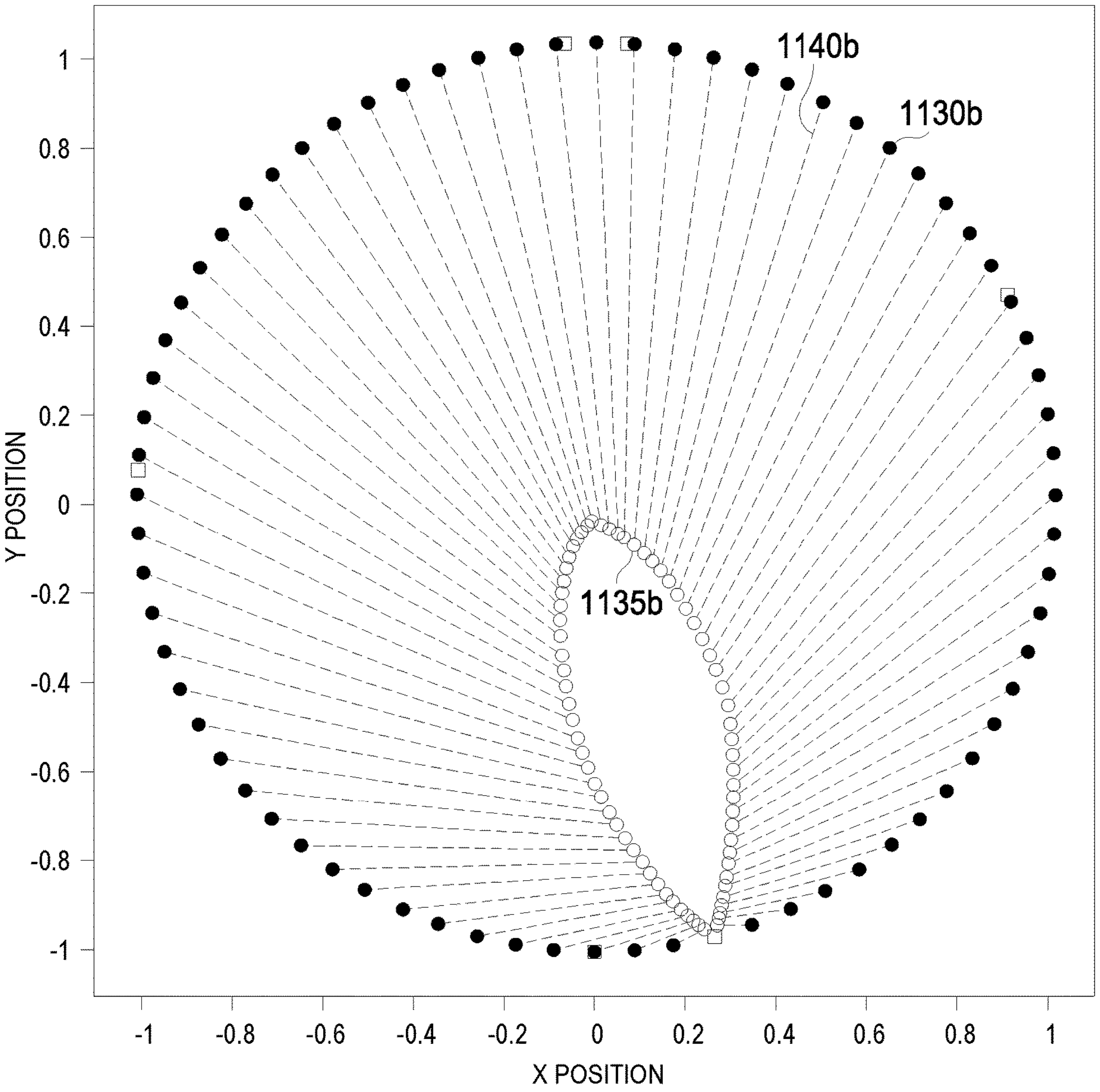
FIG. 14 is a graph of object rendering positions in an example embodiment.
Figure 17:
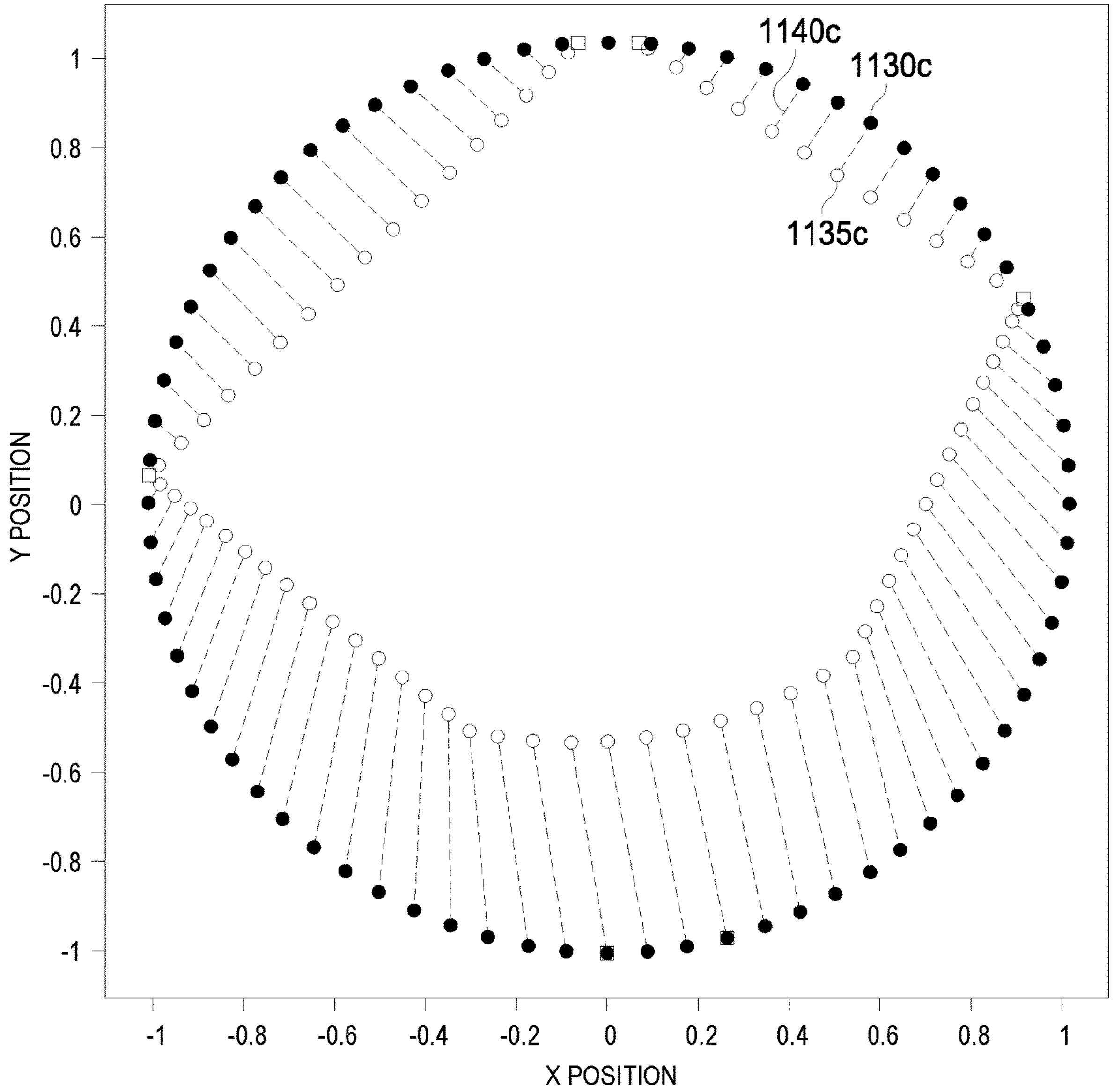
FIG. 17 is a graph of object rendering positions in an example embodiment.
Figure 20:
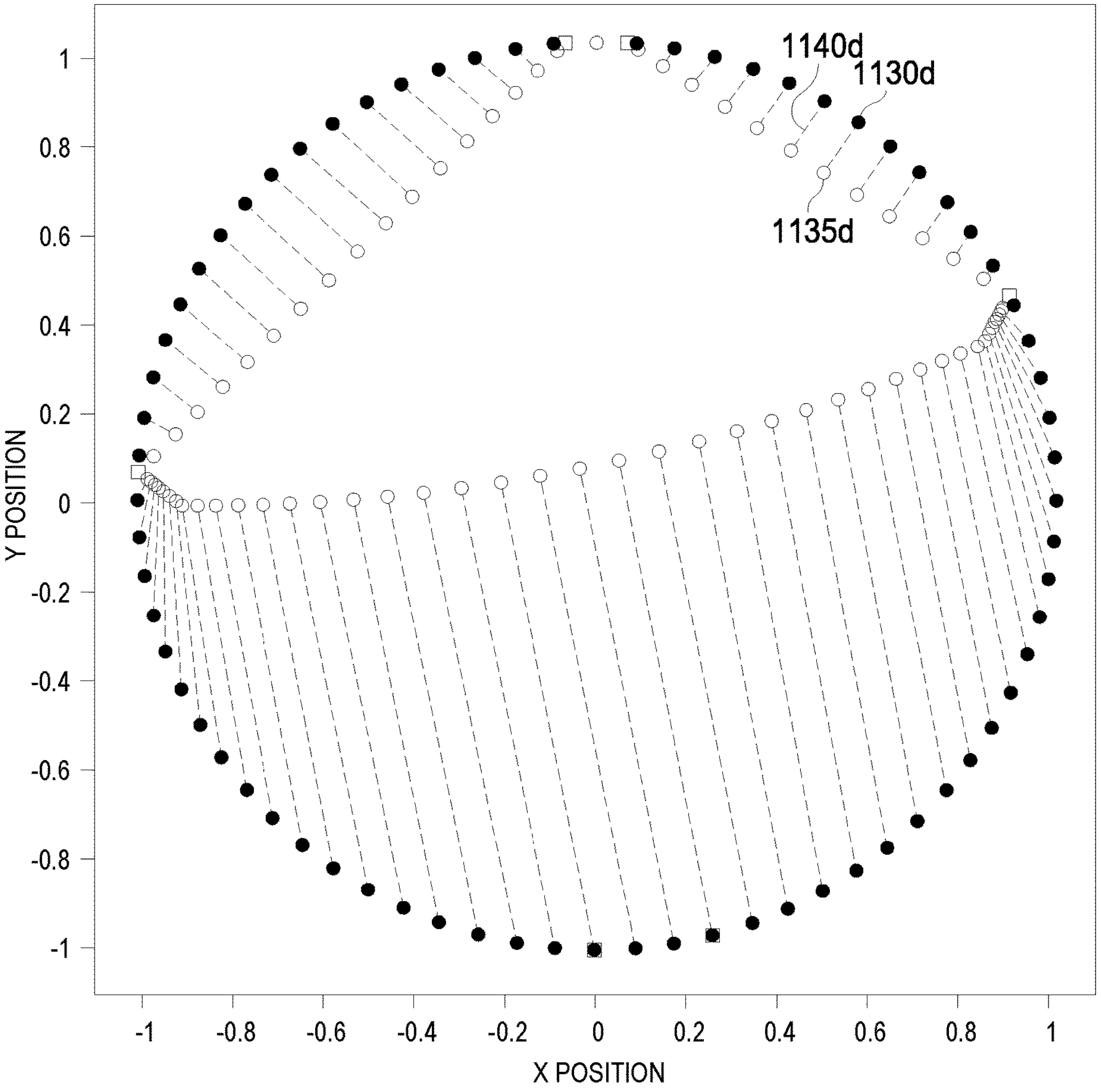
FIG. 20 is a graph of object rendering positions in an example embodiment.

FIG. 14 is a graph of object rendering positions in an example embodiment. In FIGS. 14, 17 and 20, the loudspeaker positions are the same as those shown in FIG. 11. In this example, FIG. 14 shows the corresponding ideal object positions 1130*b* for a multitude of possible object angles and the corresponding actual rendering positions 1135*b* for those objects, connected to the ideal object positions 1130*b* by dotted lines 1140*b*. The skewed orientation of the actual rendering positions 1135*b* towards the fixed position $\vec{l}_j$ illustrates the impact of the attractor weightings on the optimal solution to the cost function.

Figure 15A:
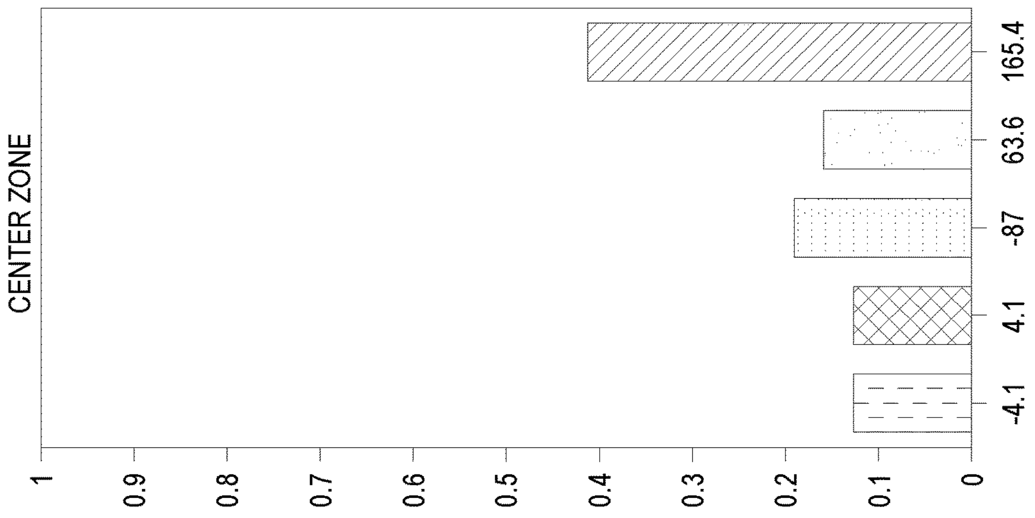
FIGS. 15A, 15B and 15C show examples of loudspeaker participation values corresponding to the examples of FIGS. 13 and 14.
Figure 15B:
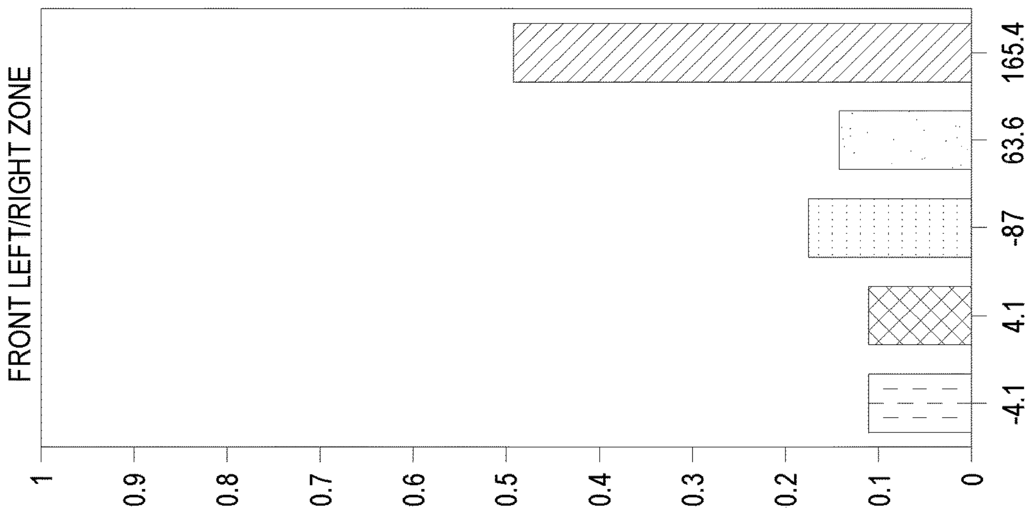
Figure 15C:
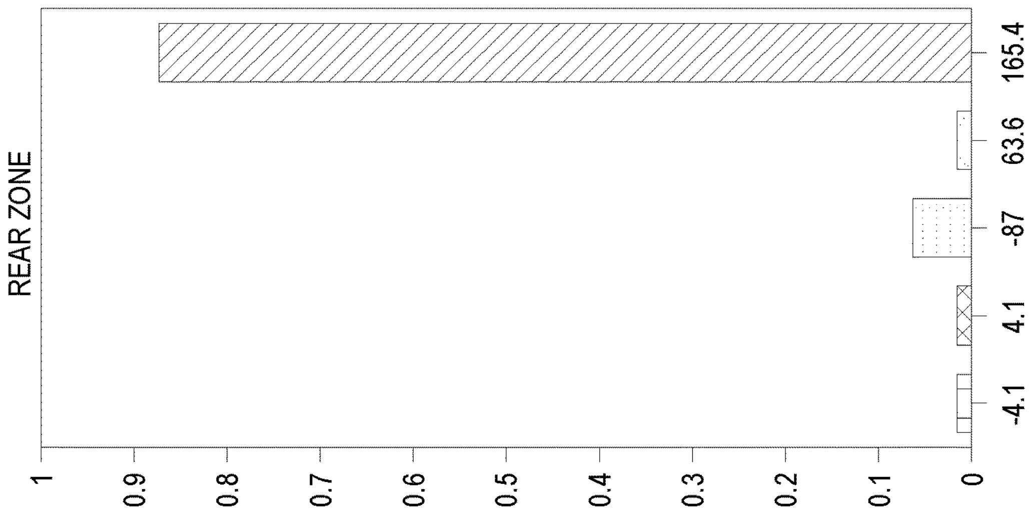

FIGS. 15A, 15B and 15C show examples of loudspeaker participation values corresponding to the examples of FIGS. 13 and 14. In FIGS. 15A, 15B and 15C, angle −4.1 corresponds to speaker position 1115 of FIG. 11, angle 4.1 corresponds to speaker position 1120 of FIG. 11, angle −87 corresponds to speaker position 1105 of FIG. 11, angle 63.6 corresponds to speaker position 1125 of FIG. 11 and angle 165.4 corresponds to speaker position 1110 of FIG. 11. According to these examples, the loudspeaker participation values shown in FIGS. 15A, 15B and 15C correspond to each loudspeaker's participation in each of the spatial zones shown in FIG. 6: the loudspeaker participation values shown in FIG. 15A correspond to each loudspeaker's participation in the center zone, the loudspeaker participation values shown in FIG. 15B correspond to each loudspeaker's participation in the front left and right zones, and the loudspeaker participation values shown in FIG. 15C correspond to each loudspeaker's participation in the rear zone.

To illustrate the use case of pushing audio away from a listener or talker, we specifically set $\alpha_j=5$, $\beta_j=2$, and $\vec{l}_j$ to a vector corresponding to a listener/talker position of 180 degrees (at the bottom, center of the plot). These values of $\alpha_j$, $\beta_j$, and $\vec{l}_j$ are merely examples. As noted above, in some examples $\alpha_j$ may be in the range of 1 to 100 and $\beta_j$ may be in the range of 1 to 25.

Figure 16:
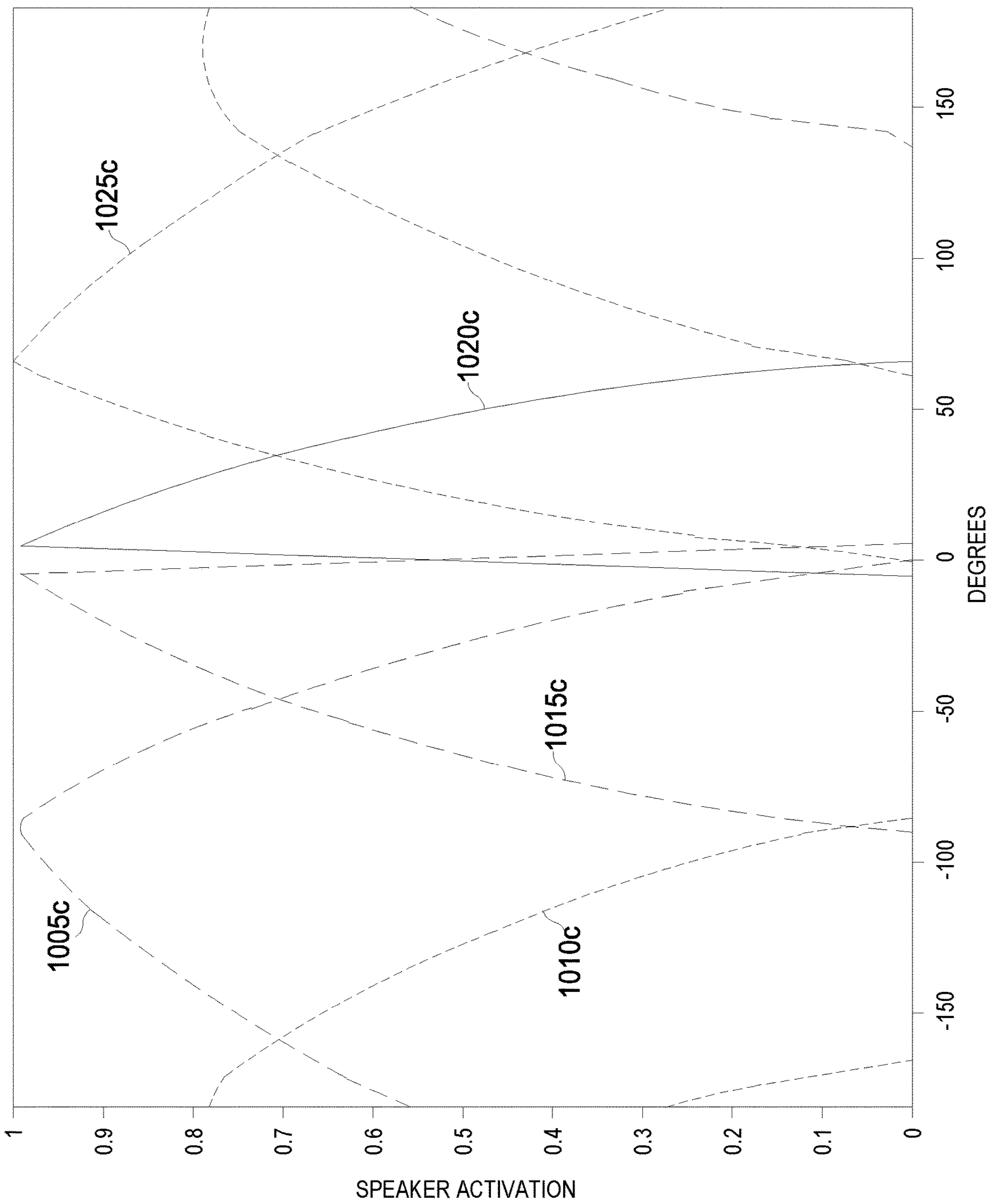
FIG. 16 is a graph of speaker activations in an example embodiment.

FIG. 16 is a graph of speaker activations in an example embodiment. According to this example, FIG. 16 shows the speaker activations 1005c, 1010c, 1015c, 1020c and 1025c, which comprise the optimal solution to the cost function for the same speaker positions as previous figures, with the addition of the repelling force represented by $w_{ij}$.

FIG. 17 is a graph of object rendering positions in an example embodiment. In this example, FIG. 17 shows the ideal object positions 1130c for a multitude of possible object angles and the corresponding actual rendering positions 1135c for those objects, connected to the ideal object positions 1130c by dotted lines 1140c. The skewed orientation of the actual rendering positions 1135c away from the fixed position $\vec{l}_j$ illustrates the impact of the repeller weightings on the optimal solution to the cost function.

Figure 18C:
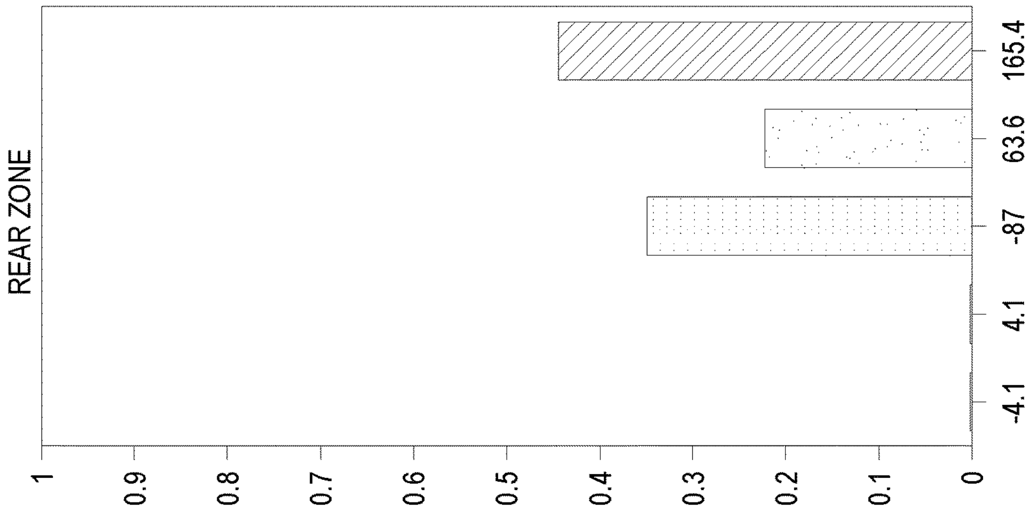
FIGS. 18A, 18B and 18C show examples of loudspeaker participation values corresponding to the examples of FIGS. 16 and 17.
Figure 18B:
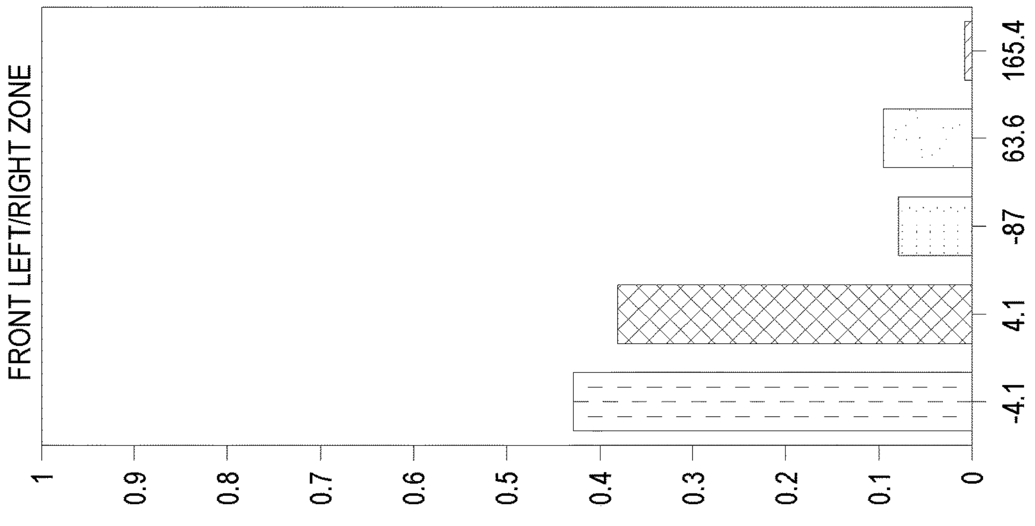
Figure 18A:
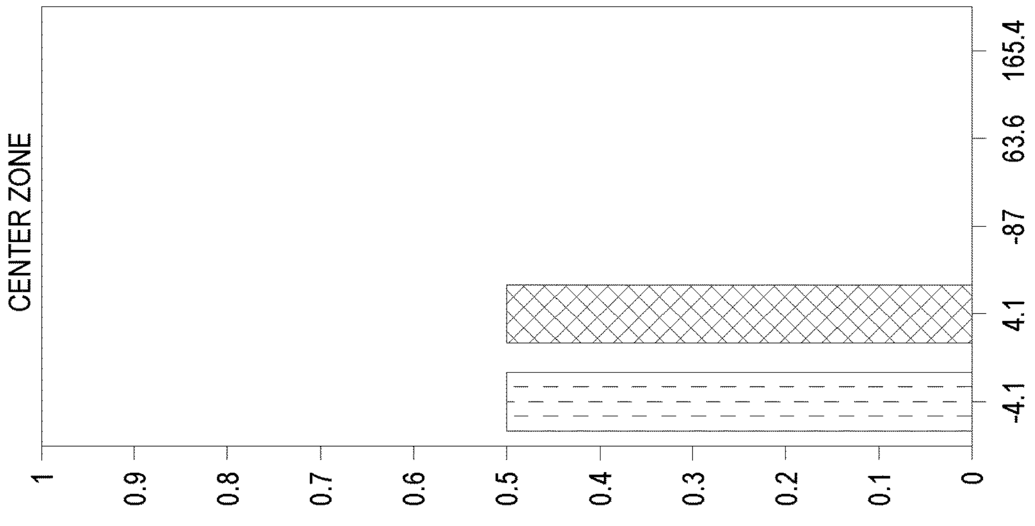

FIGS. 18A, 18B and 18C show examples of loudspeaker participation values corresponding to the examples of FIGS. 16 and 17. According to these examples, the loudspeaker participation values shown in FIGS. 18A, 18B and 18C correspond to each loudspeaker's participation in each of the spatial zones shown in FIG. 6: the loudspeaker participation values shown in FIG. 18A correspond to each loudspeaker's participation in the center zone, the loudspeaker participation values shown in FIG. 18B correspond to each loudspeaker's participation in the front left and right zones, and the loudspeaker participation values shown in FIG. 18C correspond to each loudspeaker's participation in the rear zone.

Another example use case is "pushing" audio away from a landmark which is acoustically sensitive, such as a door to a sleeping baby's room. Similarly to the last example, we set $\vec{l}_j$ to a vector corresponding to a door position of 180 degrees (bottom, center of the plot). To achieve a stronger repelling force and skew the soundfield entirely into the front part of the primary listening space, we set $\alpha_j=20$, $\beta_j=5$.

Figure 19:
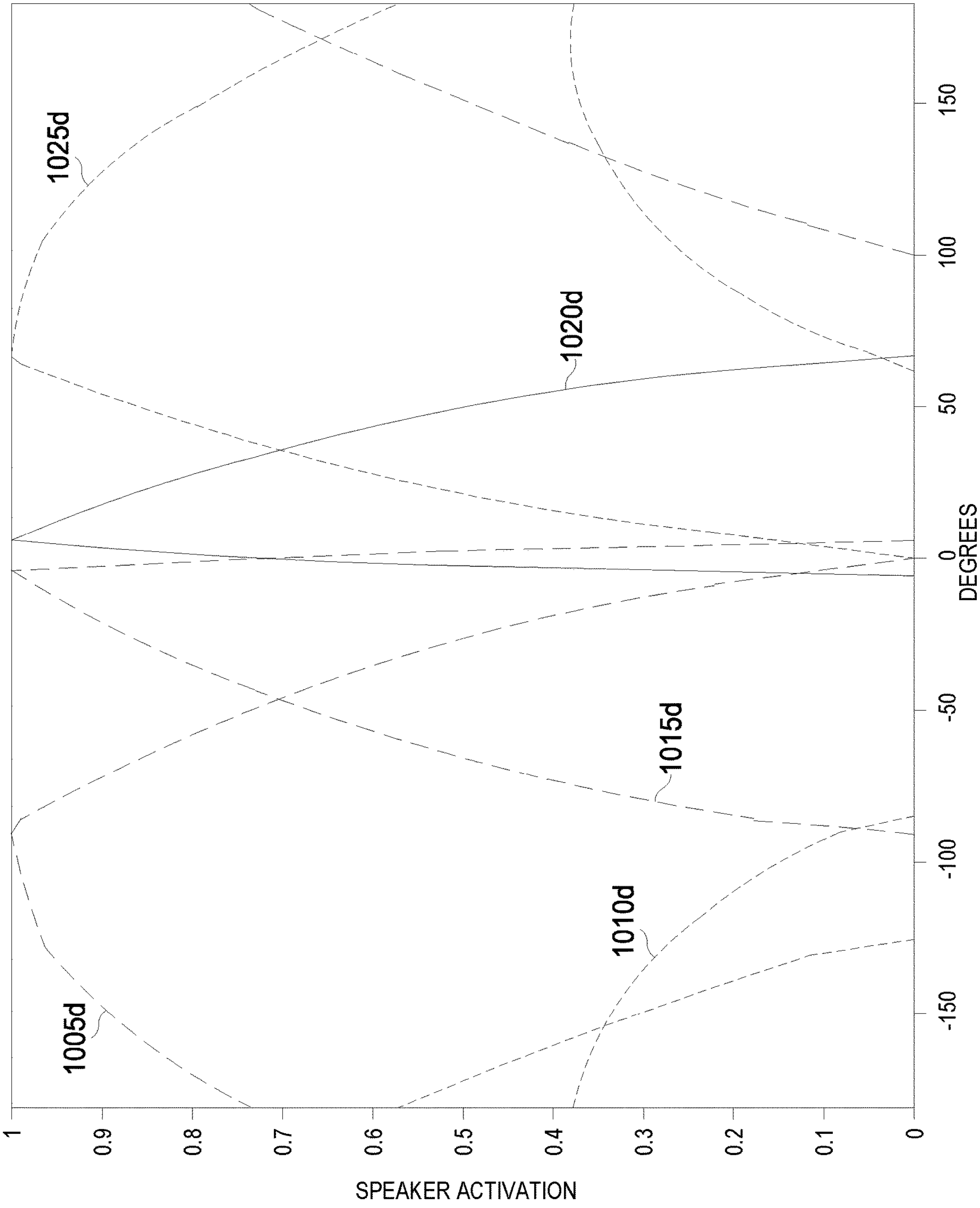
FIG. 19 is a graph of speaker activations in an example embodiment.

FIG. 19 is a graph of speaker activations in an example embodiment. Again, in this example FIG. 19 shows the speaker activations 1005d, 1010d, 1015d, 1020d and 1025d, which comprise the optimal solution to the same set of speaker positions with the addition of the stronger repelling force.

FIG. 20 is a graph of object rendering positions in an example embodiment. And again, in this example FIG. 20 shows the ideal object positions 1130d for a multitude of possible object angles and the corresponding actual rendering positions 1135d for those objects, connected to the ideal object positions 1130d by dotted lines 1140d. The skewed orientation of the actual rendering positions 1135d illustrates the impact of the stronger repeller weightings on the optimal solution to the cost function.

Figure 21A:
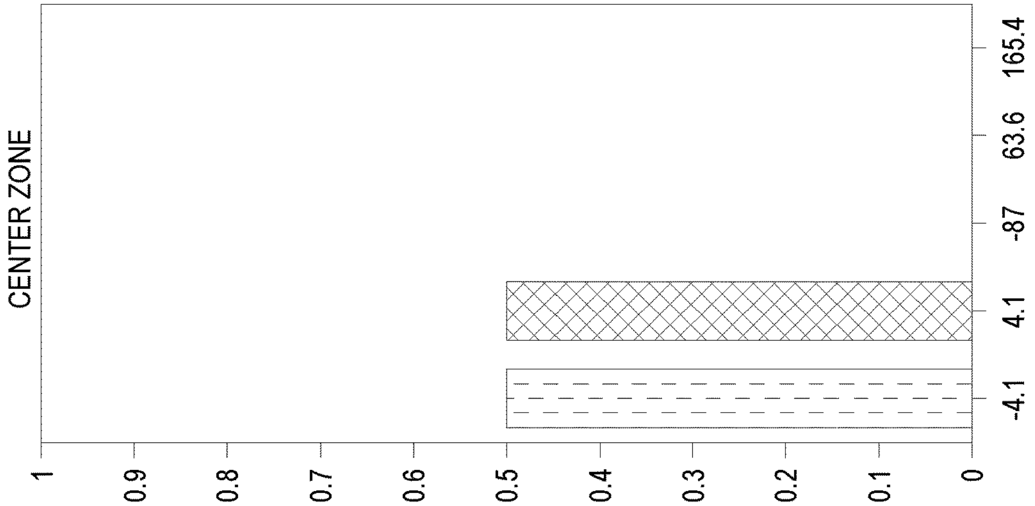
FIGS. 21A, 21B and 21C show examples of loudspeaker participation values corresponding to the examples of FIGS. 19 and 20.
Figure 21B:
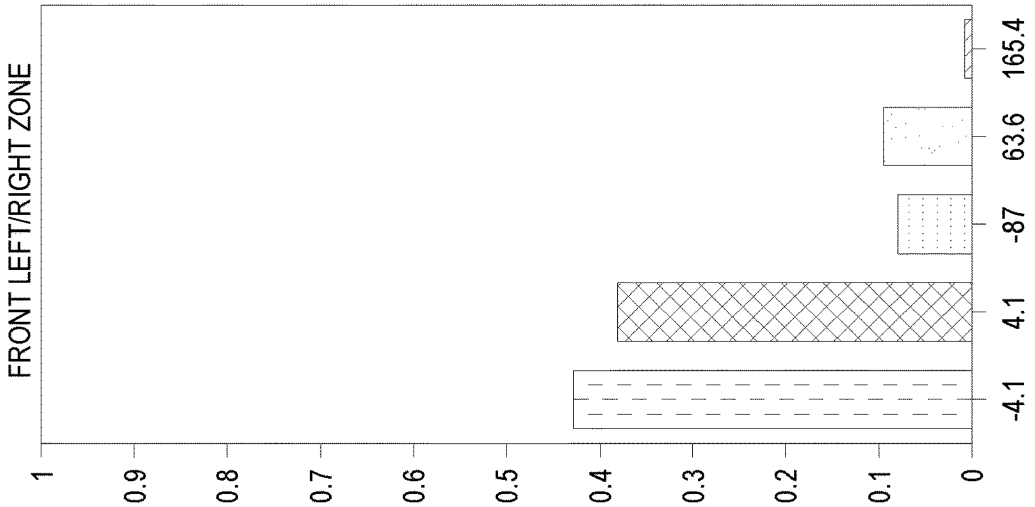
Figure 21C:
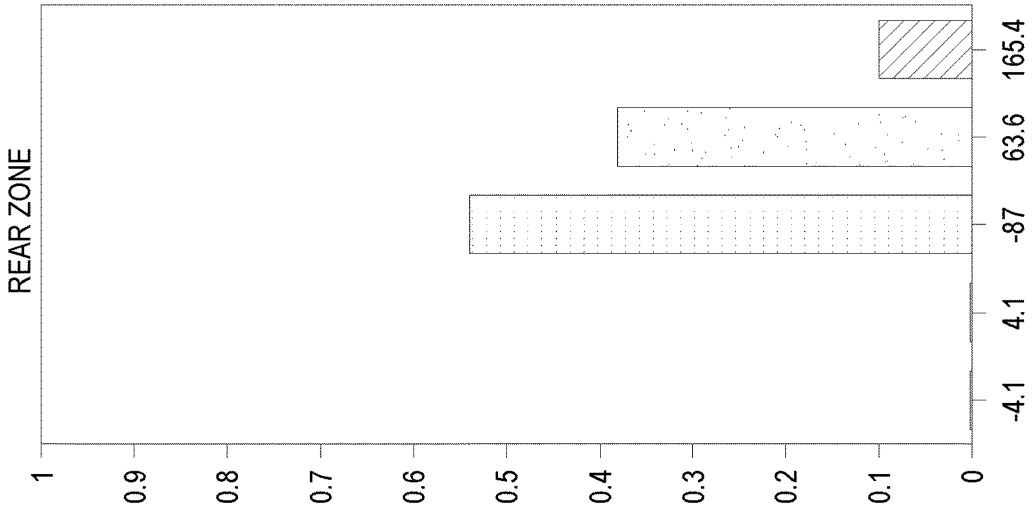

FIGS. 21A, 21B and 21C show examples of loudspeaker participation values corresponding to the examples of FIGS. 19 and 20. According to these examples, the loudspeaker participation values shown in FIGS. 21A, 21B and 21C correspond to each loudspeaker's participation in each of the spatial zones shown in FIG. 6: the loudspeaker participation values shown in FIG. 21A correspond to each loudspeaker's participation in the center zone, the loudspeaker participation values shown in FIG. 21B correspond to each loudspeaker's participation in the front left and right zones, and the loudspeaker participation values shown in FIG. 21C correspond to each loudspeaker's participation in the rear zone.

Figure 22:
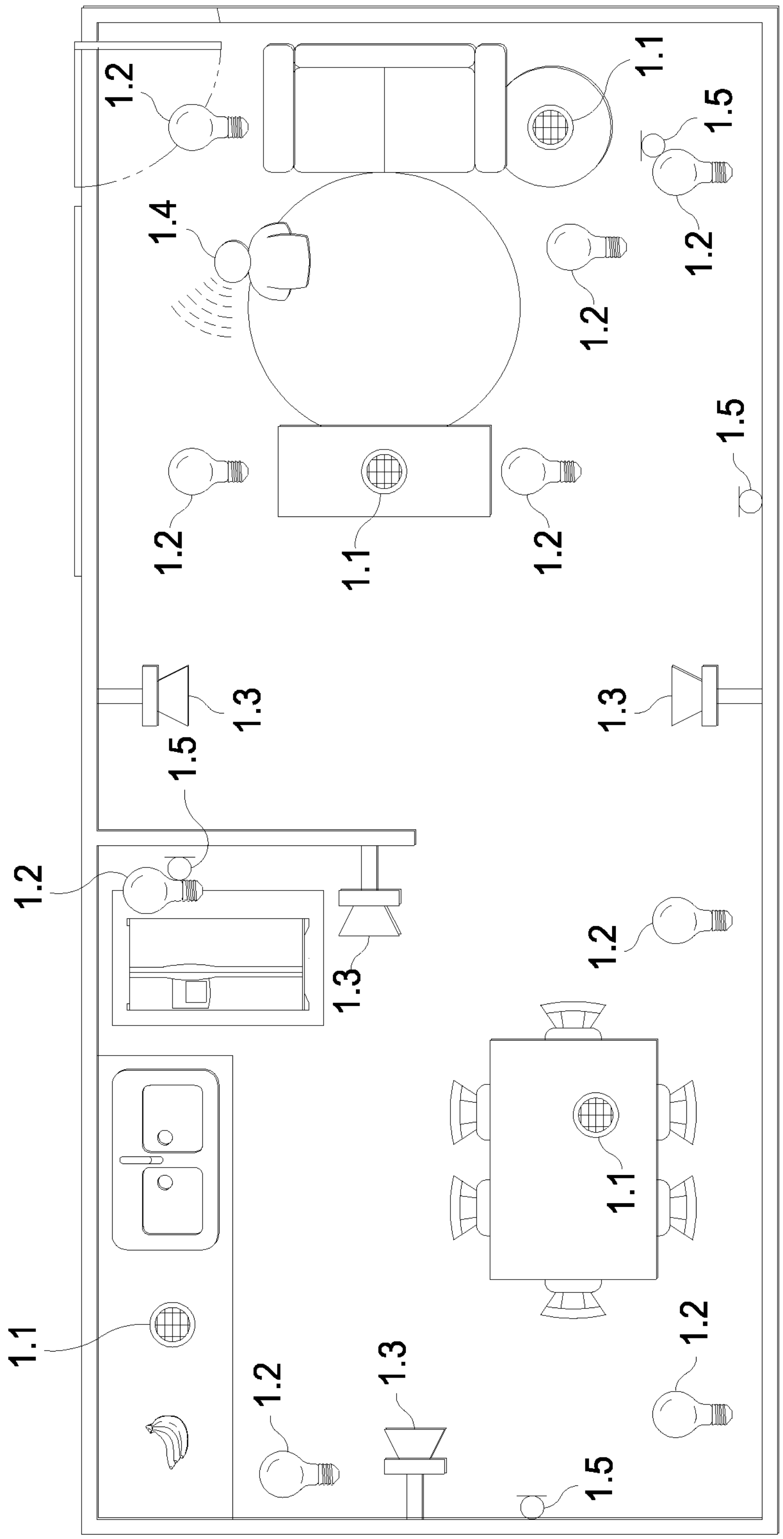
FIG. 22 is a diagram of an environment, which is a living space in this example.

FIG. 22 is a diagram of an environment, which is a living space in this example. The environment shown in FIG. 22 includes a set of smart audio devices (devices 1.1) for audio interaction, speakers (1.3) for audio output, and controllable lights (1.2). In an example, only the devices 1.1 contain microphones and therefore have a sense of where is a user (1.4) who issues a vocal utterance (e.g., wakeword command) Using various methods, information may be obtained collectively from these devices to provide a positional estimate (e.g., a fine grained positional estimation) of the user who issues (e.g., speaks) the wakeword.

In such a living space there are a set of natural activity zones where a person would be performing a task or activity, or crossing a threshold. These action areas (zones) are where there may be an effort to estimate the location (e.g., to determine an uncertain location) or context of the user to assist with other aspects of the interface. A rendering system including (i.e., implemented by) at least some of the devices 1.1 and speakers 1.3 (and/or, optionally, at least one other subsystem or device) may operate to render audio for playback (e.g., by some or all of speakers 1.3) in the living space or in one or more zones thereof. It is contemplated that such a rendering system may be operable in either a reference spatial mode or a distributed spatial mode in accordance with any embodiment of the disclosed method. In the FIG. 8 example, the key action areas are:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The TV couch (at the right of the open area);
6. The TV itself;
7. Tables; and
8. The door area or entry way (in the upper right region of the living space).

There are often a similar number of lights with similar positioning to suit action areas. Some or all of the lights may be individually controllable networked agents.

In accordance with some embodiments, audio is rendered (e.g., by one of devices 1.1, or another device of the FIG. 22 system) for playback (in accordance with any disclosed embodiment) by one or more of the speakers 1.3 (and/or speaker(s) of one or more of devices 1.1).

A class of embodiments involve methods for rendering audio for playback, and/or playback of the audio, by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices. Many interactions with the system are contemplated which require dynamic modifications to the rendering and/or playback. Such modifications may be, but are not necessarily, focused on spatial fidelity.

Some embodiments implement rendering for playback, and/or playback, by speaker(s) of a plurality of smart audio devices that are coordinated (orchestrated). Other embodiments implement rendering for playback, and/or playback, by speaker(s) of another set of speakers.

Some embodiments (e.g., a rendering system or renderer, or a rendering method, or a playback system or method) pertain to systems and methods for rendering audio for playback, and/or playback, by some or all speakers (i.e., each activated speaker) of a set of speakers. In some embodiments, the speakers are speakers of a coordinated (orchestrated) set of smart audio devices. Examples of such embodiments include the following enumerated example embodiments (EEEs):

EEE1. A method for rendering audio for playback by at least two speakers, including steps of:

(a) combining limit thresholds of the speakers, thereby determining combined thresholds;

(b) performing dynamics processing on the audio using the combined thresholds to generate processed audio; and (c) rendering the processed audio to speaker feeds.

EEE2. The method of Claim EEE1, wherein the limit thresholds are a set of one or more playback limit thresholds which represent limits at different frequencies.

EEE3. The method of Claim EEE1 or Claim EEE2, wherein said combining of limit threshold involves taking a minimum across the thresholds of the plurality of loudspeakers.

EEE3. The method of Claim EEE1 or Claim EEE2, wherein said combining of limit thresholds involves an averaging process across the limit thresholds of the plurality of loudspeakers.

EEE5. The method of Claim EEE4, wherein said averaging process is a weighted average.

EEE6. The method of Claim EEE5, wherein said weighting is derived as a function of said rendering.

EEE7. The method of any one of Claims EEE1-EEE6, wherein said rendering is spatial.

EEE8. The method of Claim EEE7, wherein said limiting of audio program stream involves limiting differently in different spatial zones.

EEE9. The method of Claim EEE8, wherein the thresholds of each spatial zone are derived through unique combinations of the playback limit thresholds of the plurality of loudspeakers.

EEE10. The method of Claim EEE9, wherein the unique thresholds of each spatial zone are derived through a weighted average of the limit thresholds of the plurality of loudspeakers.

EEE11. The method of Claim EEE10, wherein the weighting associated with a given loudspeaker for a given zone is derived from a speaker participation factor associated with that zone.

EEE12. The method of Claim EEE11, wherein said speaker participation factor is derived from speaker activations corresponding to the rendering of one or more nominal spatial positions assigned to said spatial zone of the limiter.

EEE13. The method of any one of claims EEE 1-EEE12, which further involves limiting the speaker feeds according to the limit thresholds associated with the corresponding speaker.

EEE14. A system configured to perform the method of any one of claims EEE1-EEE13.

Many embodiments involve technologically possible. It will be apparent to those of ordinary skill in the art from the present disclosure how to implement them. Some embodiments described herein.

Some aspects of the present disclosure include a system or device configured (e.g., programmed) to perform any disclosed method, and a tangible computer readable medium (e.g., a disc) which stores code for implementing any disclosed method or steps thereof. For example, a system can be or include a programmable general purpose processor, digital signal processor, or microprocessor, programmed with software or firmware and/or otherwise configured to perform any of a variety of operations on data, including an embodiment of a disclosed method or steps thereof. Such a general purpose processor may be or include a computer system including an input device, a memory, and a processing subsystem that is programmed (and/or otherwise configured) to perform a disclosed method (or steps thereof) in response to data asserted thereto.

Some embodiments are implemented as a configurable (e.g., programmable) digital signal processor (DSP) that is configured (e.g., programmed and otherwise configured) to perform required processing on audio signal(s), including performance of one or more disclosed methods. Alternatively, some embodiments (or elements thereof) are implemented as a general purpose processor (e.g., a personal computer (PC) or other computer system or microprocessor, which may include an input device and a memory) which is programmed with software or firmware and/or otherwise configured to perform any of a variety of operations of one or more disclosed methods. Alternatively, elements of some embodiments are implemented as a general purpose processor or DSP configured (e.g., programmed) to perform one or more disclosed methods, and the system may also include other elements (e.g., one or more loudspeakers and/or one or more microphones). A general purpose processor configured to perform one or more disclosed methods may be coupled to an input device (e.g., a mouse and/or a keyboard), a memory and in some examples to a display device.

Another aspect of the present disclosure is a computer readable medium (for example, a disc or other tangible storage medium) which stores code for performing (e.g., coder executable to perform) one or more disclosed methods or steps thereof.

While specific embodiments and applications of the present disclosure have been described herein, it will be apparent to those of ordinary skill in the art that many variations on the embodiments and applications described herein are possible without departing from the scope of the present disclosure described and claimed herein. It should be understood that while certain forms of the present disclosure have been shown and described, the scope of the present disclosure is not to be limited to the specific embodiments described and shown or the specific methods described.

The invention claimed is:

1. An audio processing method, comprising:

obtaining, by a control system and via an interface system, individual loudspeaker dynamics processing configuration data for each of a plurality of loudspeakers of a listening environment, the individual loudspeaker dynamics processing configuration data including an individual loudspeaker dynamics processing configuration data set for each loudspeaker of the plurality of loudspeakers, wherein the individual loudspeaker dynamics processing configuration data includes a playback limit threshold data set for each loudspeaker of the plurality of loudspeakers;

determining, by the control system, listening environment dynamics processing configuration data for the plurality of loudspeakers, wherein determining the listening environment dynamics processing configuration data is based on the individual loudspeaker dynamics processing configuration data set for each loudspeaker of the plurality of loudspeakers, wherein determining the listening environment dynamics processing configuration data involves averaging the playback limit thresholds across the plurality of loudspeakers;

receiving, by the control system and via the interface system, audio data including one or more audio signals and associated spatial data, the spatial data including at least one of channel data or spatial metadata;

performing dynamics processing, by the control system, on the audio data based on the listening environment dynamics processing configuration data, to generate processed audio data;

rendering, by the control system, the processed audio data for reproduction via a set of loudspeakers that includes at least some of the plurality of loudspeakers, to produce rendered audio signals; and providing, via the interface system, the rendered audio signals to the set of loudspeakers.

2. The audio processing method of claim 1, wherein the playback limit threshold data set includes playback limit thresholds for each of a plurality of frequencies.

3. The audio processing method of claim 1, wherein determining the listening environment dynamics processing configuration data involves averaging the playback limit thresholds to obtain averaged playback limit thresholds across the plurality of loudspeakers, determining minimum playback limit thresholds across the plurality of loudspeakers and interpolating between the minimum playback limit thresholds and the averaged playback limit thresholds.

4. The audio processing method of claim 3, wherein averaging the playback limit thresholds involves determining a weighted average of the playback limit thresholds.

5. The audio processing method of claim 4, wherein the weighted average is based, at least in part, on characteristics of a rendering process implemented by the control system.

6. The audio processing method of claim 5, wherein performing dynamics processing on the audio data is based on spatial zones, each of the spatial zones corresponding to a subset of the listening environment, wherein the weighted average of the playback limit thresholds is based, at least in part, on activation of loudspeakers by the rendering process as a function of audio signal proximity to the spatial zones.

7. The audio processing method of claim 5, wherein the weighted average is based, at least in part, on a loudspeaker participation value for each loudspeaker in each of the spatial zones.

8. The audio processing method of claim 7, wherein each loudspeaker participation value is based, at least in part, on one or more nominal spatial positions within each of the spatial zones.

9. The audio processing method of claim 8, wherein the nominal spatial positions correspond to canonical locations of channels in a Dolby 5.1, Dolby 5.1.2, Dolby 7.1, Dolby 7.1.4 or Dolby 9.1 surround sound mix.

10. The audio processing method of claim 8, wherein each loudspeaker participation value is based, at least in part, on an activation of each loudspeaker corresponding to rendering of audio data at each of the one or more nominal spatial positions within each of the spatial zones.

11. The audio processing method of claim 1, further comprising performing dynamics processing on the rendered audio signals according to the individual loudspeaker dynamics processing configuration data for each loudspeaker of the set of loudspeakers to which the rendered audio signals are provided.

12. The audio processing method of claim 1, wherein the individual loudspeaker dynamics processing configuration data includes, for each loudspeaker of the plurality of loudspeakers, a dynamic range compression data set.

13. The audio processing method of claim 12, wherein the dynamic range compression data set includes one or more of threshold data, input/output ratio data, attack data, release data or knee data.

14. The audio processing method of claim 1, wherein the individual loudspeaker dynamics processing configuration data for one or more loudspeakers of the plurality of loudspeakers corresponds with one or more capabilities of the one or more loudspeakers.

15. A system configured to perform the method of claim 1.

16. One or more non-transitory media having software stored thereon, the software including instructions for controlling one or more devices to perform the method of claim 1.

* * * * *